(12) United States Patent
Asakura

(10) Patent No.: US 7,574,099 B2
(45) Date of Patent: Aug. 11, 2009

(54) RECORDING/PLAYBACK APPARATUS, RECORDING METHOD AND PLAYBACK METHOD OF CODED DATA IN TWO FORMATS

(75) Inventor: Hiroyuki Asakura, Kanagawa (JP)

(73) Assignee: Sony Corporation, Tokyo (JP)

( * ) Notice: Subject to any disclaimer, the term of this patent is extended or adjusted under 35 U.S.C. 154(b) by 787 days.

(21) Appl. No.: 11/063,496

(22) Filed: Feb. 23, 2005

(65) Prior Publication Data

US 2005/0185935 A1    Aug. 25, 2005

(30) Foreign Application Priority Data

Feb. 24, 2004    (JP)    .......................... P2004-047633

(51) Int. Cl.
*H04N 5/78* (2006.01)
(52) U.S. Cl. ........................................ 386/34
(58) Field of Classification Search ................. 386/112, 386/33, 34; 375/240.27–240.29; 348/512, 348/513
See application file for complete search history.

(56) References Cited

U.S. PATENT DOCUMENTS 4,134,131 A * 1/1979 Hopkins, Jr. ................ 348/513

| | | | | |
|---|---|---|---|---|
| 4,766,495 A | * | 8/1988 | Kobayashi et al. | .......... 348/513 |
| 5,949,441 A | * | 9/1999 | Ristau | ........................ 345/533 |
| 6,285,404 B1 | * | 9/2001 | Frank | ........................ 348/469 |

FOREIGN PATENT DOCUMENTS

| | | | |
|---|---|---|---|
| JP | 56 109066 | | 8/1981 |
| JP | 62-164391 | * | 7/1987 |
| JP | 4 353671 | | 12/1992 |
| JP | 5 274798 | | 10/1993 |
| JP | 11-136631 | * | 10/1999 |
| JP | 2002-34002 | * | 1/2002 |

* cited by examiner

*Primary Examiner*—David E Harvey
(74) *Attorney, Agent, or Firm*—Frommer Lawrence & Haug LLP; William S. Frommer; Paul A. Levy

(57) ABSTRACT

A recording apparatus performs processing for recording first data on a recording medium. The recording apparatus includes a baseband-signal output controller controlling an output of a baseband signal. A first buffer buffers the baseband signal to be output under the control of the baseband-signal output controller. A codec performs codec processing based on a system clock, which is different from the baseband signal. A recorder records the first data on the recording medium.

11 Claims, 11 Drawing Sheets

RECORDING/PLAYBACK APPARATUS, RECORDING METHOD AND PLAYBACK METHOD OF CODED DATA IN TWO FORMATS

CROSS REFERENCES TO RELATED APPLICATIONS

The present invention contains subject matter related to Japanese Patent Application JP 2004-047633 filed in the Japanese Patent Office on 24 Feb. 2004, the entire contents of which are incorporated herein by reference.

BACKGROUND OF THE INVENTION

1. Field of the Invention

The present invention relates to recording/playback apparatuses, recording methods, playback methods, and programs. More particularly, the invention relates to a recording/playback apparatus, a recording method, a playback method, and a program, which are suitable for recording two formats of coded data having different amounts of data on a predetermined recording medium.

2. Description of the Related Art

Technologies for recording or playing back video data and audio data on or from optical discs are known. For example, the following technology is disclosed in Japanese Unexamined Patent Application Publication No. 11-136631. In a field editing system for editing video signals captured by a television camera in a shooting site, when recording video data and audio data on an optical disc, two formats of coded data having different amounts of data are generated and recorded on an optical disc so that management of materials or editing operations can be simplified.

In the above-described technology, raw video and audio data are coded by being compressed into two formats of coded data having different amounts of data, and are temporarily stored in a large-capacity memory (buffer), and are then stored in an optical disc.

More specifically, it is now considered that the above-described technology is used in a recording/playback apparatus for recording or playing back data on or from a recording medium, such as an optical disc. For example, as shown in FIG. 1, a baseband signal is coded in a codec 1 by being compressed into two formats of coded data having different amounts of data, and the two formats of coded data are supplied to a compressed-data buffer 2 and are then stored in a predetermined recording medium, such as an optical disc. In this case, the codec 1 is operated based on the system clock of the baseband signal, and the time when the two formats of compressed data are supplied to the compressed-data buffer 2 is also controlled by the system clock of the baseband signal. However, the time when the two formats of data are recorded on the predetermined recording medium from the compressed-data buffer 2 is not determined by the system clock of the baseband signal. For example, even when the processing time at which the data is recorded on the predetermined recording medium is much faster than the system clock of the baseband signal, the processing for recording the compressed data on a recording medium is not disturbed by controlling the time at which the data is read from the compressed-data buffer 2.

When reading data from a predetermined recording medium, such as an optical disc, the coded data is supplied to the compressed-data buffer 2, and is read at a rate corresponding to the processing rate of the codec 1. The codec 1 then performs decoding processing by using the system clock of the baseband signal and outputs a non-compressed baseband signal. That is, even when the reading speed for the data recorded on a predetermined recording medium is faster than the processing rate of the codec 1, in other words, even when the system clock for controlling the reading processing for data recorded on a predetermined recording medium, such as a disc, is faster than the system clock of the baseband signal, the processing of the codec 1 is not disturbed by controlling the time at which the data is read from the compressed-data buffer 2. As a result, the baseband signal having continuous frames can be output.

SUMMARY OF THE INVENTION

In a recording/playback apparatus for recording or playing back video data and audio data on or from a recording medium, such as an optical disc, the reception of, not only baseband signals, but also data input from a fast external interface, for example, an IEEE1394 interface or gigabit Ethernet (registered), is becoming common. Thus, the connection of the apparatus with such a fast interface is demanded.

Accordingly, when recording video data and audio data supplied from a fast external interface on an optical disc, it is necessary, as discussed above, that two formats of coded data having different amounts of data (i.e., different resolution levels) be generated and recorded so that management of materials or editing operations can be simplified, for example, in a field editing system for editing video signals captured by a television camera in a shooting site.

In the above-described known technology, however, codec processing is controlled based on the timing clock of a baseband signal. Accordingly, video data and audio data supplied from a fast external interface is subjected to coding processing with a low frame rate based on the system clock of the baseband signal, thereby hampering faster recording/playback processing. That is, in the codec 1 shown in FIG. 1, both the timing at which frame data is input and the timing at which processed data is output are determined by the system clock of the baseband signal.

In contrast, if, in order to increase the rate of recording/playback processing, the timing clock of coding processing is simply adjusted to the timing clock of a fast external interface, processing for decoding coded data recorded on a recording medium into a baseband signal is disturbed.

Accordingly, in view of the above-described background, it is desirable to increase the recording/playback processing rate without disturbing processing for decoding coded data to be recorded on a recording medium, such as a disc, into a baseband signal.

According to an embodiment of the present invention, there is provided a recording apparatus performing processing for recording first data on a recording medium. The recording apparatus includes a baseband-signal output controller controlling an output of a baseband signal. A first buffer buffers the baseband signal to be output under the control of the baseband-signal output controller. A codec performs codec processing based on a system clock, which is different from the baseband signal. A recorder records the first data on the recording medium.

The first data recorded on the recording medium may include at least second data having a predetermined resolution and third data having a resolution lower than the first data. The codec may encode the second data and the third data in parallel. Alternatively, the codec may encode the second data and the third data by switching the second data and the third data at regular time intervals.

The recording apparatus may further include a compression-coded data input/output controller controlling an input and an output of compression-coded second data having a predetermined resolution based on a system clock different from the baseband signal, and a second buffer buffering the second data to be output under the control of the compression-coded data input/output controller or the first data to be recorded on the recording medium. When the format of the second data to be input under the control of the compression-coded data input/output controller is equal to the format of the first data, the second buffer may buffer the second data, the codec may decode the second data to generate third data having a resolution lower than the second data, and then further encodes the third data, and the recorder may record the first data including the second data buffered in the second buffer and the third data encoded by the codec on the recording medium.

The first data may be time-division multiplexed data in which a plurality of types of data including at least the second data and the third data are multiplexed by being divided at regular time intervals.

The recording apparatus may further include a compression-coded data input/output controller controlling an input and an output of compression-coded second data having a predetermined resolution based on a system clock different from the baseband signal. When the format of the second data to be input under the control of the compression-coded data input/output controller is different from the format of the first data to be recorded on the recording medium, the codec may decode the second data and then encodes the decoded second data with the same format as the first data, and also generates third data having a resolution lower than the decoded second data and then further encodes the third data. The recorder may record the second data and the third data encoded by the codec on the recording medium.

The first data may be time-division multiplexed data in which a plurality of types of data including at least the second data and the third data are multiplexed by being divided at regular time intervals.

According to another embodiment of the present invention, there is provided a recording method for a recording apparatus recording first data generated based on compression-coded data on a predetermined recording medium. The recording method includes the steps of: decoding the compressed-coded data having a predetermined resolution into non-compressed data based on a predetermined system clock, which is different from a system clock of a baseband signal; converting the non-compressed data into low-resolution data having a resolution lower than the compression-coded data and encoding the low-resolution data by a predetermined method to generate low-resolution second data; and generating the first data including at least the compression-coded data and the low-resolution second data and controlling the first data to be recorded on the recording medium.

According to another embodiment of the present invention, there is provided a program allowing a computer to execute processing for recording first data generated based on compression-coded data on a predetermined recording medium. The program includes the steps of: decoding the compressed-coded data having a predetermined resolution into non-compressed data based on a predetermined system clock, which is different from a system clock of a baseband signal; converting the non-compressed data into low-resolution data having a resolution lower than the compression-coded data and encoding the low-resolution data by a predetermined method to generate low-resolution second data; and generating the first data including at least the compression-coded data and the low-resolution second data and controlling the first data to be recorded on the recording medium.

According to another embodiment of the present invention, there is provided a recording method for a recording apparatus recording first data generated based on non-compressed data on a predetermined recording medium. The recording method includes the steps of: buffering the non-compressed data having a predetermined resolution input based on a system clock of a baseband signal; reading the buffered non-compressed data and encoding the non-compressed data based on a predetermined system clock, which is different from the system clock of the baseband signal, to generate second data, and also converting the non-compressed data into low-resolution data and encoding the low-resolution data based on a predetermined system clock, which is different from the system clock of the baseband signal, to generate low-resolution third data; and generating the first data including at least the encoded second data and the encoded third data and controlling the first data to be recorded on the recording medium.

According to another embodiment of the present invention, there is provided a program allowing a computer to execute processing for recording first data generated based on non-compressed data on a predetermined recording medium. The program includes the steps of: buffering the non-compressed data having a predetermined resolution input based on a system clock of a baseband signal; reading the buffered non-compressed data and encoding the non-compressed data based on a predetermined system clock, which is different from the system clock of the baseband signal, to generate second data, and also converting the non-compressed data into low-resolution data and encoding the low-resolution data based on a predetermined system clock, which is different from the system clock of the baseband signal, to generate low-resolution third data; and generating the first data including at least the encoded second data and the encoded third data and controlling the first data to be recorded on the recording medium.

According to another embodiment of the present invention, there is provided a playback method for a playback apparatus playing back compression-coded data recorded on a predetermined recording medium or compression-coded data obtained from a predetermined data input/output portion. The playback method includes the steps of: decoding the compression-coded data into non-compressed data based on a first system clock; buffering the non-compressed data; and reading the buffered non-compressed data based on a second system clock, which is different from the first system clock, and outputting the non-compressed data.

According to another embodiment of the present invention, there is provided a program allowing a computer to execute processing for playing back compression-coded data recorded on a predetermined recording medium or compression-coded data obtained from a predetermined data input/output portion. The program includes the steps of: decoding the compression-coded data into non-compressed data based on a first system clock; buffering the non-compressed data; and reading the buffered non-compressed data based on a second system clock, which is different from the first system clock, and outputting the non-compressed data.

In the recording apparatus, the recording method, the playback method, and the program according to embodiments of the present invention, a baseband signal to be input or output is buffered, and coding processing is performed based on a system clock, which is different from the system clock of the baseband signal. Then, first data is recorded or played back on or from a recording medium.

According to an embodiment of the present invention, data can be recorded on a recording medium, and when receiving, not only a baseband signal, but also data via a fast interface, fast processing for recording the data on the recording medium can be achieved.

DESCRIPTION OF THE PREFERRED EMBODIMENTS

The present invention is described in detail below with reference to the accompanying drawings through illustration of preferred embodiments.

Figure 2:
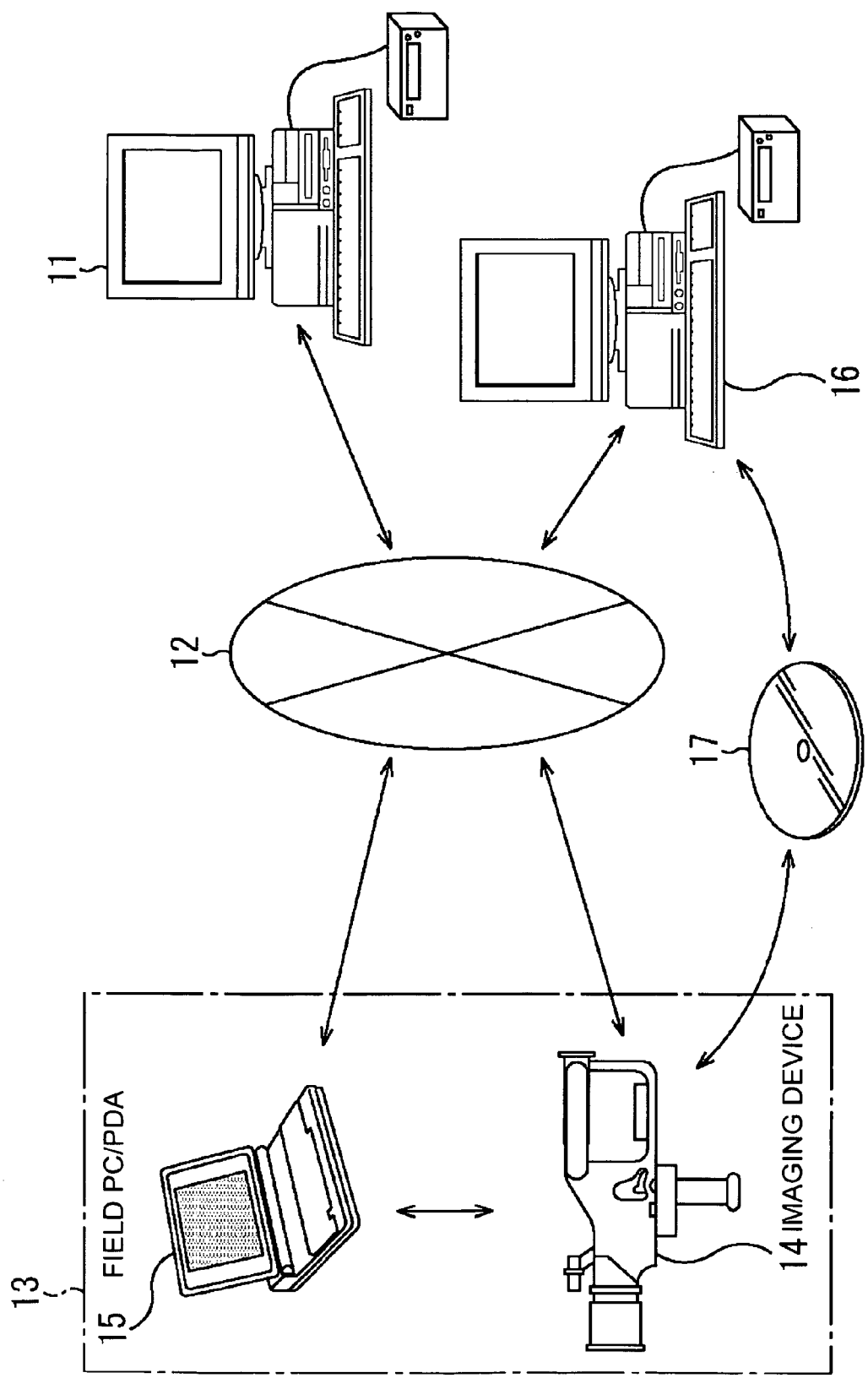
FIG. 2 illustrates a video-program production support system according to an embodiment of the present invention.

FIG. 2 is a schematic diagram illustrating a video-program production support system according to an embodiment of the present invention.

The video-program production support system shown in FIG. 2 is disposed in, for example, a television broadcasting station for broadcasting television signals or a production company for video content, such as video programs or movies, and is used for producing video programs, which are video works of, for example, television programs and movies. In this system, metadata in electronic file format added to a video program can be consistently used among a plurality of sections sharing the production of a video program, thereby facilitating efficient production of video programs.

The video-program production support system includes, as shown in FIG. 2, a planning terminal device 11 for planning a video program, a network 12 connected to the planning terminal device 11, a shooting terminal device 13 connected to the network 12, an editing terminal device 16 connected to the network 12, and an optical disc 17, which serves as a recording medium. The shooting terminal device 13 further includes an imaging device 14 and a field personal-computer/personal-digital-assistant (field PC/PDA) 15 (hereinafter simply referred to as the "field PC 15").

The planning terminal device 11 is formed of an information processing apparatus, such as a personal computer, and peripheral devices thereof, and is disposed in a planning section for planning video programs. The planning section, which controls the overall production of a video program, plans and designs a video program to be produced and creates a scenario (plot) of the video program. The planning section also gives instructions concerning production works to other sections, such as a shooting section and an editing section, which are described below. The planning terminal device 11 forms, for each video program, electronic-format configuration table metadata containing instructions concerning the scenario of a video program. The planning terminal device 11 supplies the configuration table metadata to the shooting terminal device 13 via the network 12. Accordingly, the planning section can give instructions concerning the scenes or content to be collected or photographed to the shooting section.

The shooting terminal device 13 is a terminal device group used in a shooting section, and is formed of, for example, the imaging device 14 and the field PC 15. The shooting section collects materials and performs shooting in a production site according to production instructions and a scenario supplied from the planning section, and photographs images in individual scenes forming a video program and also collects photographing situations.

The imaging device 14 is a video camera, for example, a camcorder (registered), and is used for collecting materials for broadcasting news programs, relaying sport games, or photographing video content, such as a movie. The imaging device 14 obtains a configuration table metadata from the above-described planning terminal device 11 via the network 12, and displays the configuration table metadata on a predetermined display unit to allow the photographing staff, such as photographers, to recognize the content to be photographed. By being operated by the photographing staff, the imaging device 14 can photograph individual scenes forming a video program based on production instruction information contained in the configuration table metadata. The video data and audio data obtained by photographing are recorded on the optical disc 17.

The imaging device 14 can record, not only original video data obtained by photographing, but also low-resolution video data, on the optical disc 17. Since the original video data has a large amount of data and is high quality data, it is used as a finished product of a video program. In contrast, the low-resolution data is video data generated by reducing the number of pixels of each frame of the original video data. The low-resolution data may be encoded by, for example, the MPEG4 method. Although the low-resolution data has a quality lower than the original video data, it has a smaller amount of data. Accordingly, the low-resolution data is mainly used for rough editing processing, since the load for sending or playing back the low-resolution data is lighter. The optical disc 17 on which the video data and audio data are recorded by the imaging device 14 is transferred to an editing section, which is discussed below, or the field PC 15.

The optical disc 17, which serves as the recording medium on which video content is recorded by the imaging device 14, may be a mini-disc (registered) or a magneto-optical disk (MO). The recording medium may be other than the optical disc 17, for example, a magnetic disk including a flexible disk, magnetic tape used for a digital video (DV) or a video home system (VHS), or a semiconductor memory including a flash memory.

The field PC 15 is formed of, for example, a portable information processing apparatus, such as a notebook personal computer or a PDA, and peripheral devices thereof. The field PC 15 is connected to the imaging device 14 by a wired circuit or a wireless circuit so as to share, for example, configuration table metadata or video content with the imaging device 14.

The field PC 15 can obtain configuration table metadata from the planning terminal device 11 via the network 12 or from the imaging device 14. The field PC 15 displays the obtained configuration table metadata on a predetermined display unit to allow a person in charge of the shooting section to recognize content to be collected or photographed.

The field PC 15 also generates photographing situation information concerning the data-collecting/photographing situations based on the input from the person in charge of the-shooting section, and adds the generated photographing situation information to the corresponding column of the configuration table metadata. The photographing situation information is text data indicated from various points of views for each take or each shooting site, and is useful for the subsequent step, i.e., editing processing. In this manner, the field PC 15 edits the configuration table metadata by writing photographing situation information. The field PC 15 also supplies the photographing situation information to the imaging device 14 as metadata, and allows the imaging device 14 to add the information to the video data and audio data obtained in the imaging device 14.

The editing terminal device 16 is formed of an information processing apparatus, such as a personal computer, and peripheral devices thereof, and is disposed in an editing section for editing video content. The editing section edits the video data and audio data obtained by the imaging device 14 based on the production instructions and scenarios provided by the planning section and based on the configuration table metadata reflecting the data-collecting/photographing situations provided by the shooting section so as to complete a video program.

The editing terminal device 16 obtains configuration table metadata and low-resolution data from the imaging device 14 via the network 12, and obtains original video data and audio-data from the optical disc 17. The editing terminal device 16 can directly obtain production instructions concerning editing from the planning terminal device 11 or the field PC 15 via the network 12.

The editing terminal device 16 suitably plays back and displays the obtained video content data based on the obtained configuration table metadata. For example, by being operated by the user, the editing terminal device 16 can sequentially display the coded original video data and audio data obtained via the network 12 or the original and low-resolution video data and audio data recorded on the optical disc 17 according to the scenario, or displays only desired clips of the video data. The editing terminal device 16 plays back the video data recorded on the optical disc 17 or edits video data obtained from an external source and records the edited data on the optical disc 17. Thus, the editing terminal device 16 serves as a disc drive for reading or writing data from or into the optical disc 17.

As stated above, the editing terminal device 16 plays back and displays the necessary video data in a suitable order based on the configuration table metadata. The editing terminal device 16 also performs editing processing on video data obtained by the shooting operation. The editing processing includes rough editing processing and detailed editing processing.

The rough editing processing is simple editing processing on video data and audio data. Data concerning the video content including video data and audio data corresponds to a clip, which is the unit for one image-capturing operation. Such data is hereinafter referred to as "clip data". When, in the rough editing processing, a plurality of items of clip data are obtained, clip data used for detailed editing is selected among the obtained plurality of items of clip data, and a necessary video portion is further selected (logged) from the selected clip data. Then, the editing start position (in point) and the editing end position (out point) corresponding to the selected video portion are set by using, for example, time codes. As a result, the necessary video portion can be extracted (ingested).

The clip is the unit representing, not only one image-capturing operation, but also the time from the start to the end of the image-capturing operation or the length and amount of various data obtained by the capturing operation. The clip also indicates a set of various data obtained by the capturing operation.

The detailed editing processing is for forming perfect packaged data to be broadcast as a program by splicing clip data subjected to the rough editing processing and by making the final adjustment to the image quality of the video data.

The planning terminal devices 11, the imaging devices 14, the field PCs 15, and the editing terminal devices 16 may be provided in the plural. For example, video data obtained by a plurality of imaging devices 14 may be supplied to the single editing terminal device 16 via the optical disc 17 or the network 12, and is edited in the editing terminal device 16. Alternatively, data supplied from the single imaging device 14 may be edited by a plurality of editing terminal devices 16.

In the above description, the planning terminal device 11, the imaging device 14, the field PC 15, and the editing terminal device 16 are separately provided. However, part of or the entire functions of the above devices may be integrated into each other.

In the video-program production support system shown in FIG. 2, a center server (not shown) connected to the network 12 may be disposed separately from the planning terminal device 11, the imaging device 14, the field PC 15, and the editing terminal device 16. Then, a client/server system using the planning terminal device 11, the imaging device 14, the field PC 15, and the editing terminal device 16 as clients can be formed.

Figure 3:
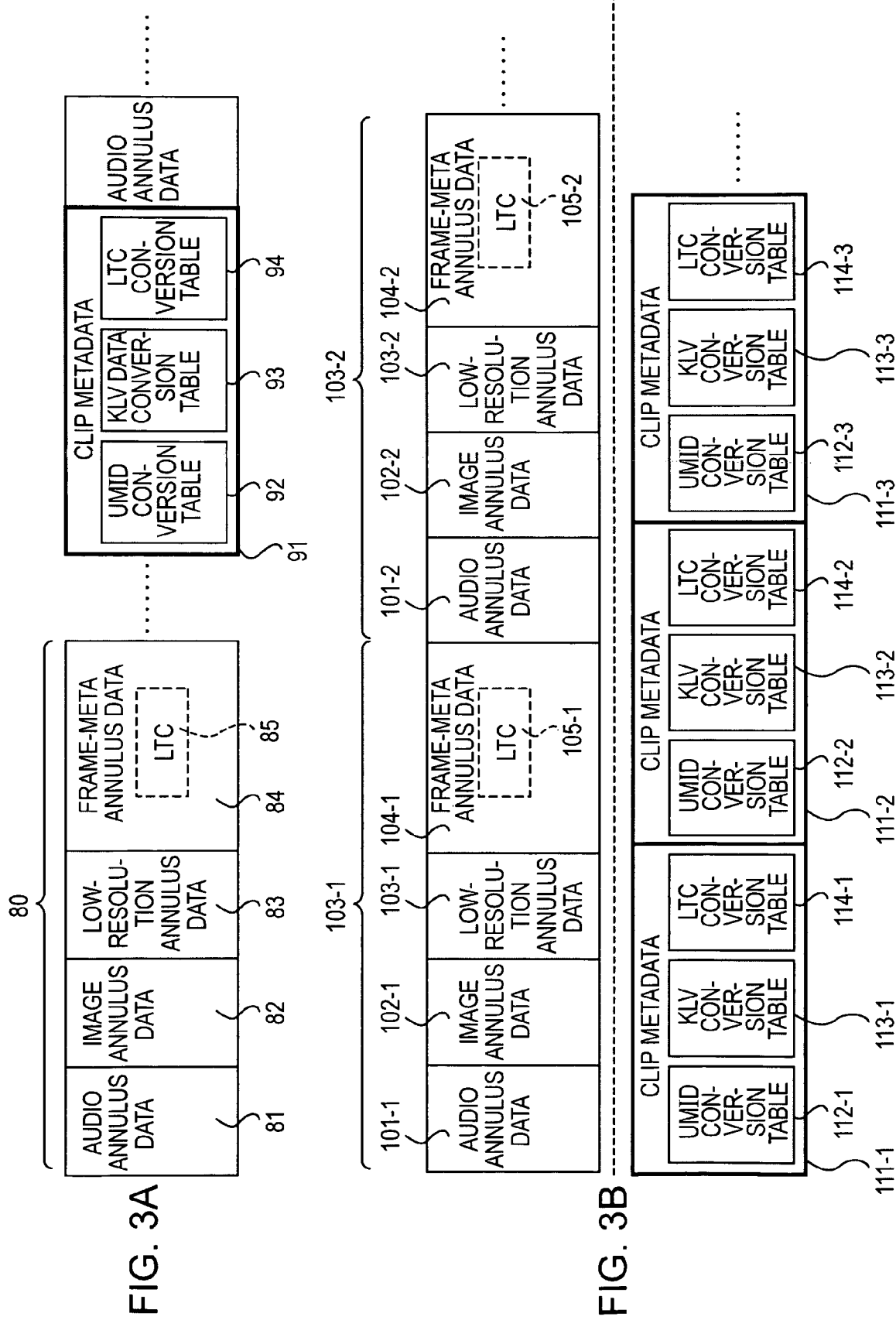
FIGS. 3A and 3B illustrate data formats to be recorded on an optical disc shown in FIG. 2.

Examples of the data configuration recorded on the optical disc 17 and used in the editing processing by the editing terminal device 16 are shown in FIGS. 3A and 3B.

The optical disc 17 may be a digital versatile disc-random access memory (DVD–RAM), a DVD-recordable (DVD–R), a DVD–ReWritable (DVD–RW), a DVD+Recordable (DVD+R), a DVD+ReWritable (DVD+RW), a Compact Disc-Recordable (CD–R), a CD–ReWritable (CD–RW), or Blue-Ray Disc™.

As stated above, a plurality of clip data containing video data and audio data are recorded on the optical disc 17 by the imaging device 14, as, for example, in FIG. 3A.

One clip of a plurality of annulus data 80 containing audio annulus data 81, image annulus data 82, low-resolution annulus data 83, and frame-meta annulus data 84, each data corresponding to a predetermined time unit, for example, two seconds, are continuously recorded on the optical disc 17 by the imaging device 14. After the final annulus data 80, clip metadata 91 corresponding to the clip of the annulus data 80 is recorded, and then, annulus data and clip metadata of another clip follow.

The audio annulus data 81 and the image annulus data 82, which have the same playback time, are associated with each other. That is, the audio annulus data 81 is audio data associated with the moving picture played back from the image annulus data 82. The low-resolution annulus data 83 is associated with the image annulus data 82 and has the same playback time as that of the image annulus data 82. That is, the low-resolution annulus data 83 is data having an image size reduced from the moving picture played back from the image annulus data 82. The frame-meta annulus data 84 is formed of metadata (hereinafter referred to as "frame metadata") added to each frame of the moving picture of the image annulus data 82. That is, the frame-meta annulus data 84 is formed of a plurality of frame metadata for all the frames of the image annulus data 82.

The frame metadata is added to the corresponding frame and is required to be real time when an image signal is played back. More specifically, the frame metadata includes a linear time code (LTC), which is the time code characterizing the image signal corresponding to the frame by predetermined time information, such as the time and date (second, minute, hour, day, month, and year), the user bit (UB) or the unique material identifier (UMID) indicating the signal characteristic of the image signal of the frame, global positioning system (GPS) information concerning the position at which the image is captured by the video camera, essence marks, which are information concerning the content of essence data of the image signal or audio signal, the Association of Radio Industries and Business (ARIB) metadata, and setting/control information concerning the video camera used for image capturing. The ARIB metadata, which is metadata standardized by ARIB, is superimposed on a standard communication interface, such as a serial digital interface (SDI). The setting/control information concerning the video camera includes an iris control value, a white-balance/black-balance mode, and lens information concerning the lens zooming and focusing.

Accordingly, the frame-meta annulus data 84 includes an LTC 85, which is time information for frames based on the time independent of the actual time or the real time based on the predetermined time. The LTC 85 is a set of LTCs added to the individual frames, which contains the LTCs of all the frames of the image annulus data 82 of the same annulus data 80 and is played back together with the audio annulus data 81 and the image annulus data 82.

On the optical disc 17, data is recorded spirally or concentrically from the center to the outer periphery of the disc 17. Accordingly, by recording the annulus data 80 containing the audio annulus data 81, the image annulus data 82, the low-resolution data 83, and the frame-meta annulus data 84 on the optical disc 17 in imaging chronological order, the associated data items having the same playback time are recorded (located) physically adjacent to each other on the optical disc 17. Thus, in the optical disc 17, the seek time can be reduced when playing back (reading) data, and the processing time and the load necessary for processing can be reduced.

After one clip of the plurality of annulus data 80 is recorded, the clip metadata 91 is recorded.

The clip metadata 91 is data associated with the entire clip and data that is not required to be real time when the image signal is played back. The clip metadata includes a UMID conversion table 92 in which the LTCs of the individual frames are associated with the frame numbers, and other information, such as UMID and GPS information. The clip metadata 91 is mainly used for editing or searching for audio data or video data, and it is not generally required when playing back video data or audio data.

As the frame metadata or the clip metadata, data other than the above-described data may be included. The same data may be included in the frame metadata and the clip metadata. The above-described data included in the frame metadata may be used as the clip metadata. Conversely, the above-described data included in the clip metadata may be used as the frame metadata. For example, the essence marks, the ARIB metadata, or the video-camera setting/control information may be included in the clip metadata or both in the frame metadata and in the clip metadata. The UMID or GPS information may be included in the frame metadata or both in the frame metadata and in the clip metadata.

The clip metadata 91 includes, as shown in FIG. 3A, not only the UMID conversion table 92, but also a KLV data conversion table 93 and an LTC conversion table 94.

The UMID conversion table 92 is a table storing UMIDs contained in the annulus data starting from the first annulus data or from the annulus data recorded immediately after the previous clip metadata to the annulus data recorded immediately before the UMID conversion table 92. Accordingly, the UMID conversion table 92 is recorded in proximity with (compared to the position of UMID conversion tables in FIG. 3B) the audio annulus data 81 and the image annulus data 82 associated with the UMID conversion table 92. Basically, the metadata contained in the clip metadata 91 is data that is not required to be real time. However, when the user gives an instruction to play back a specific frame by using the UMID conversion table 92, the seek time can be reduced and the reading speed for the audio annulus data 81 and the image annulus data 82 is increased if the audio annulus data 81 and the image annulus data 82 to be played back are recorded in proximity with the UMID conversion table 92.

The KLV data conversion table 93 is a table storing KLV data contained in the annulus data starting from the first annulus data or from the annulus data recorded immediately after the previous clip metadata to the annulus data recorded immediately before the KLV data conversion table 93. Accordingly, the KLV data conversion table 93 is recorded in proximity with (compared to the position of KLV data conversion tables in FIG. 3B) the audio annulus data 81 and the image annulus data 82 associated with the KLV data conversion table 93. Basically, the metadata contained in the clip metadata 91 is data that is not required to be real time. However, when the user gives an instruction to play back a specific frame by using the KLV data conversion table 93, the seek time can be reduced and the reading speed for the audio annulus data 81 and the image annulus data 82 is increased if the audio annulus data 81 and the image annulus data 82 to be played back are recorded in proximity with the KLV data conversion table 93.

The LTC conversion table 94 is a table storing LTCs contained in the annulus data starting from the first annulus data or from the annulus data recorded immediately after the previous clip metadata to the annulus data recorded immediately before the LTC conversion table 94. Accordingly, the LTC conversion table 94 is recorded in proximity with (compared to the position of LTC conversion tables in FIG. 3B) the audio annulus data 81 and the image annulus data 82 associated with the LTC conversion table 94. Basically, the metadata contained in the clip metadata 91 is data that is not required to be real time. However, when the user gives an instruction to play back a specific frame by using the LTC conversion table 94, the seek time can be reduced and the reading speed for the audio annulus data 81 and the image annulus data 82 is increased if the audio annulus data 81 and the image annulus data 82 to be played back are recorded in proximity with the LCD conversion table 94.

The clip metadata may be recorded, as shown in FIG. 3B, in an area different from the area storing annulus data. In FIG. 3B, clip metadata, such as clip metadata 111-1, clip metadata 111-2, and clip metadata 111-3, are recorded in an area separately from the area storing annulus data, such as annulus data 100-1 containing audio annulus data 101-1, image annulus data 102-1, low-resolution annulus data 103-1, and frame-meta annulus data 104-1 and annulus data 100-2 containing audio annulus data 101-2, image annulus data 102-2, low-resolution annulus data 103-2, and frame-meta annulus data 104-2.

The clip metadata 111-1 through 111-3 include UMID conversion tables 112-1 through 112-3, respectively, KLV data conversion tables 113-1 through 113-3, respectively, and LTC conversion tables 114-1 through 114-3, respectively.

In the UMID conversion tables 112-1 through 112-3, the start point, the turning point, and the end point of the UMID contained in the corresponding frame-meta annulus data are registered. If a frame having the value of UMID discontinuous from the UMID of the preceding or subsequent frame, such frames are considered to be discontinuous and are registered in the UMID conversion tables 112-1 through 112-3. Although UMIDS do not always become continuous, frames switching from one image to another image are considered to be frames having discontinuous values of UMID. In the UMID conversion tables 112-1 through 112-3, UMIDs may be registered at regular frame intervals. The more number of UMIDs are registered in the UMID conversion table, the time required for calculating the frame number of a requested frame during frame search can be reduced. In this case, however, the data size of the UMID conversion table becomes larger, and the time for the overall search operation may become longer. Accordingly, the number of UMIDs contained in the UMID conversion table should be determined by considering the tradeoff relationship between the data size of the UMID conversion table and the search time.

In the KLV conversion tables 113-1 through 113-3, the start point, the turning point, and the end point of the KLV data contained in the corresponding frame-meta annulus data are registered. If a frame having the value of KLV data discontinuous from the KLV data of the preceding or subsequent frame, such frames are considered to be discontinuous and are registered in the KLV conversion tables 113-1 through 113-3. In the KLV conversion tables 113-1 through 113-3, KLV data may be registered at regular frame intervals. The more number of KLV data are registered in the KLV conversion table, the time required for calculating the frame number of a requested frame during frame search can be reduced. In this case, however, the data size of the KLV conversion table becomes larger, and the time for the overall search operation may become longer. Accordingly, the number of KLV data contained in the KLV conversion table should be determined by considering the tradeoff relationship between the data size of the KLV conversion table and the search time.

In the LTC conversion tables 114-1 through 114-3, the start point, the turning point, and the end point of the LTC contained in the corresponding frame-meta annulus data are registered. If a frame having the value of LTC discontinuous from the LTC of the preceding or subsequent frame, such frames are considered to be discontinuous and are registered in the LTC conversion tables 114-1 through 114-3. In the LTC conversion tables 114-1 through 114-3, LTC may be registered at regular frame intervals. The more number of LTCs are registered in the LTC conversion table, the time required for calculating the frame number of a requested frame during frame search can be reduced. In this case, however, the data size of the LTC conversion table becomes larger, and the time for the overall search operation may become longer. Accordingly, the number of LTCs contained in the LTC conversion table should be determined by considering the tradeoff relationship between the data size of the LTC conversion table and the search time.

In FIG. 3B, the clip metadata 111-1 through 111-3 are recorded in an area different from the annulus data 100-1 and 100-2 after performing an audio-data recording task, a video-data recording task, a low-resolution-data recording task, and a frame-metadata recording task.

Accordingly, the UMID conversion tables 112-1 through 112-3, the KLV data conversion tables 113-1 through 113-3, and the LTC conversion table 114-1 through 114-3 contained in the clip metadata 111-1 through 111-3 are recorded in proximity with each other. Thus, when a specific frame is searched for by using a plurality of conversion tables, the seek time can be reduced, and a target frame can be quickly searched for.

Additionally, when playing back audio data or video data, clip metadata, which is not necessary for a playback operation, is not present between the data to be played back, thereby reducing the reading time and facilitating the playback processing.

Since the clip metadata is data that is not required to be real time, the seek time does not have to be considered. Accordingly, the clip metadata can be physically located at any position in the optical disc 17. For example, one clip metadata can be recorded by being distributed into a plurality of positions on the optical disc 17.

As discussed above, the UMID, the KLV data, and the LTC are recorded as frame metadata together with essence marks formed of audio data and video data, and the UMID conversion table, the KLV data conversion table, and the LTC conversion table storing the start point, turning point, and end point of the UMID, the KLV data, and the LTC, respectively, are recorded as clip metadata. Thus, when editing the data recorded on the optical disc 17, the user can easily perform editing processing based on the UMID, KLV data, and LTC, and can also search for a target frame and plays it back based on the UMID, KLV data, and LTC.

Figure 4:
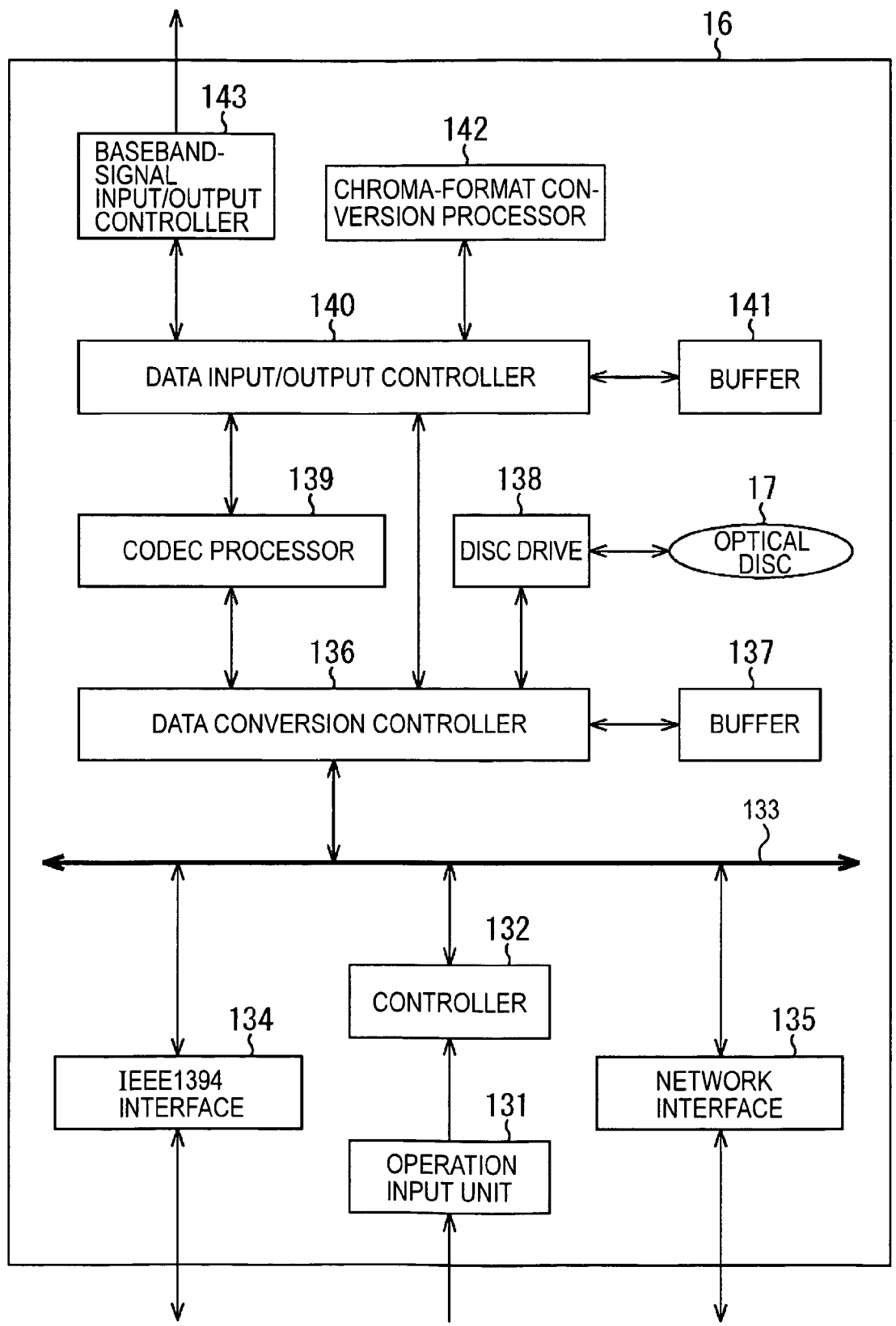
FIG. 4 is a block diagram illustrating the configuration of an editing terminal device shown in FIG. 2.

FIG. 4 is a block diagram illustrating the configuration of the editing terminal device 16 shown in FIG. 2.

An operation input unit 131, which includes, for example, buttons, keys, and a touch panel, receives the input of an operation from a user and supplies a signal indicating the input operation to a controller 132.

The controller 132, which is connected to a peripheral component interconnect (PCI) bus 133, controls the individual elements of the editing terminal device 16. For example, the controller 132 controls the input/output of data from and to an external source or the reading/writing of data from/into the optical disc 17 so as to perform the above-described editing processing in response to an operation input from the user through the operation input unit 131.

The PCI bus 133 is connected to the controller 132, an IEEE1394 interface 134, a network interface 135, and a data conversion controller 136. The PCI bus 133 allows video data, audio data, or control signals to pass therethrough, and has a bus width of 32 bits, a clock of 33 MHz, and a data transfer rate of 133 MB/second, or a bus width of 64 bits, a clock of 66 MHz, and a data transfer rate of 533 MB/second.

Among devices connected to the PCI bus 133, a device that can drive an address line to specify a communicating party and send a bus command, such as a memory read command or an I/O write command, is considered as a master, and a device without a master function that receives an address and a bus command is considered as a target device. When transferring data between master devices, the device that starts transferring data after requesting a bus transfer control is considered as an initiator, and the other device communicating with the initiator is considered as a target. In this manner, data communication is performed independent of a central processing unit (CPU).

The IEEE1394 interface 134 is connected to a network based on the IEEE1394 standards (hereinafter referred to as the "IEEE1394 network"), and supplies data stored in a packet received via the IEEE1394 network to the controller 132 or the data conversion controller 136 via the PCI bus 133. The IEEE1394 interface 1394 also stores data supplied from the controller 132 or the data conversion controller 136 in a packet defined in the IEEE1394 standards and sends the packet to a predetermined data communicating party via the IEEE1394 network.

The network interface 135 is connected to a network based on predetermined standards, for example, the Ethernet (hereinafter referred to as an "external network"), and supplies data in a format compliant with the standards of the external network received via the external network to the controller 132 or the data conversion controller 136 via the PCI bus 133. The network interface 135 also converts data supplied from the controller 132 or the data conversion controller 136 into the format defined in the standards of the external network and sends the data to a predetermined data communicating party via the external network.

The data conversion controller 136 controls the input/output of data from and to a codec processor 139 and also controls data conversion performed by the codec processor 139. The data conversion controller 136 can be implemented by, for example, a field programmable gate array (FPGA). The FPGA is one type of gate array based on a static random access memory (SRAM), which can be overwritten any number of times, and the FPGA containing several thousands to several tens of thousands of gates is now commercially available. An image processing or audio processing circuit, which is difficult to be implemented by a combination of a GAL and a transistor-transistor logic (TTL) IC, can be implemented by a single FPGA.

A buffer 137 is formed of, for example, a large-capacity synchronous dynamic random access memory (SD RAM), and is connected to the data conversion controller 136. Under the control of the data conversion controller 136, the buffer 137 receives and buffers data, and also reads out the data.

A disc drive 138 can install or remove the optical disc 17 that can record data having the format shown in FIG. 3A or 3B. The disc drive 138 reads original data (for example, the audio annulus data 81 and the image annulus data 82 shown in FIG. 3A) or low-resolution data (for example, the low-resolution annulus data 83 shown in FIG. 3A) compressed and coded in a predetermined format (for example, IMX, which is one type of coding method for coding video data into only MPEG intra (I) pictures) from the optical disc 17 installed in the disc drive 138, and supplies the read data to the data conversion controller 136. More specifically, the disc drive 138 includes a built-in pickup device (not shown), and the pickup device applies laser light to the optical disc 17, receives the reflected light from the optical disc 17, and outputs a radio frequency (RF) signal corresponding to the quantity of received light. The disc drive 138 performs necessary processing, such as demodulation, on the RF signal and supplies the resulting data to the data conversion controller 136. The disc drive 138 also records original data or low-resolution data supplied from the data conversion controller 136 on the optical disc 17 by using the pickup device.

The codec processor 139 decodes or encodes compression-coded data supplied from the data conversion controller 136 or a non-compressed baseband signal supplied from a data input/output controller 140 under the control of the data conversion controller 136. The codec processor 139 can perform processing based on a timing clock without being dependent on the system clock of the baseband signal.

Figure 1:
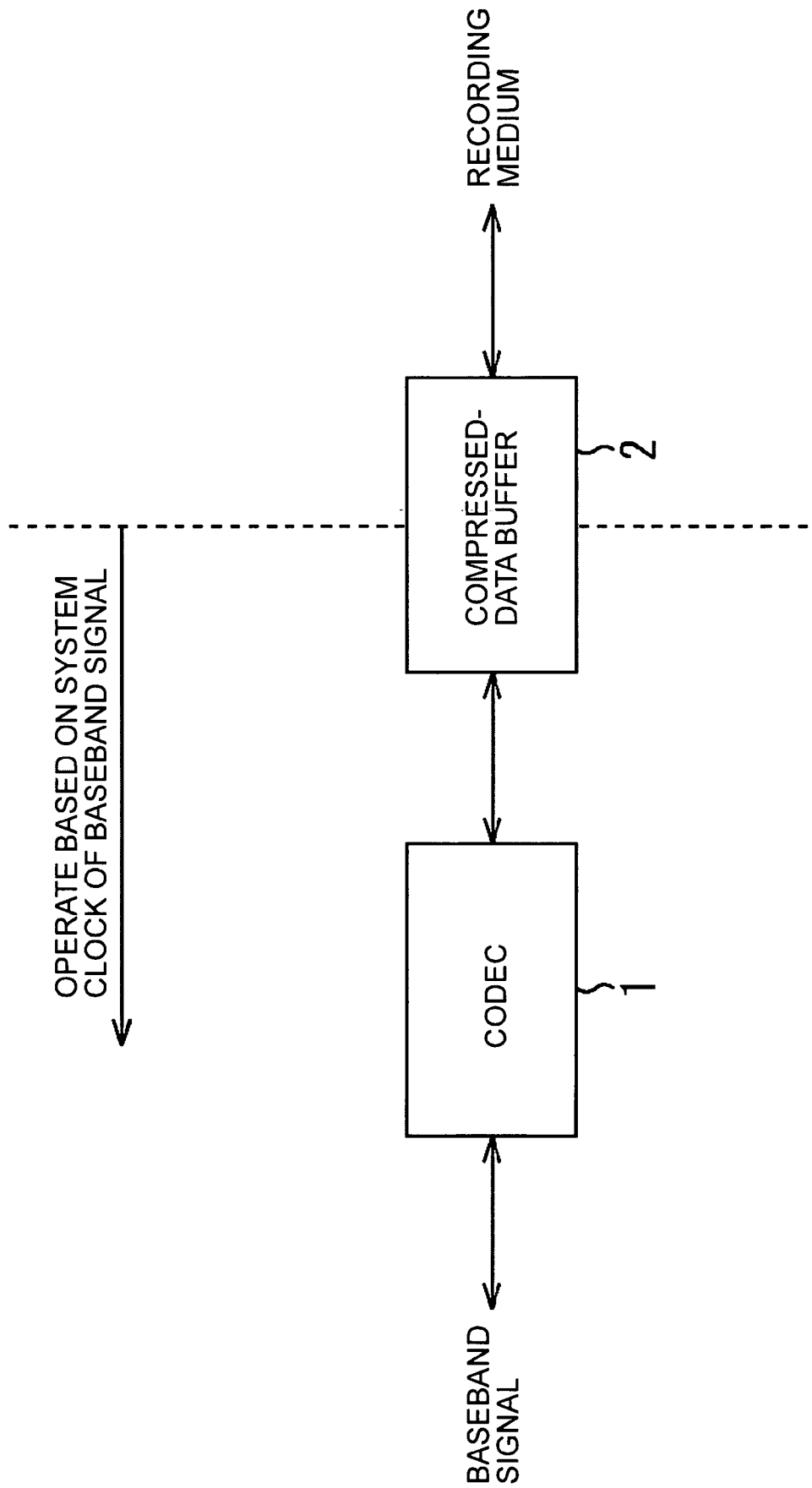
FIG. 1 illustrates a system clock in known codec processing.

Known codec processing is performed in synchronization with the system clock of a baseband signal, as discussed with reference to FIG. 1. Accordingly, the codec 1 shown in FIG. 1 receives frame data in synchronization with a system clock of the baseband signal and outputs processed data in synchronization with the subsequent system clock. In contrast, when receiving the input of a baseband signal based on the system clock of the baseband signal, the codec processor 139 performs encoding without depending on the system clock of the baseband signal, i.e., based on, for example, a system clock faster than the system clock of the baseband signal, and then outputs the encoded compressed-coded data without the need to wait for the input of the subsequent system clock of the baseband signal. Similarly, when receiving the input of compression-coded data, the codec processor 139 decodes the data without being depending on the system clock of the baseband signal, i.e., based on, for example, a system clock faster than the system clock of the baseband signal, and then outputs the decoded non-compressed data without the need to wait for the input of the subsequent system clock of the baseband signal.

That is, if the codec processor 139 can operate based on a system clock n times as fast as the system clock of the baseband signal, it can perform codec processing at a rate n times as fast as in the known codec processing.

The codec processor 139 can process one type of data at high speed or a plurality of types of data in parallel. More specifically, the codec processor 139 may separately include an IMX-data encoder/decoder, a digital-video (DV)-data encoder/decoder, and a low-resolution-data generating encoder. Alternatively, the codec processor 139 may be formed of a single high-speed codec processor, and may execute IMX-data encoding/decoding, DV-data encoding/decoding, low-resolution-data encoding in a time division manner (for example, by switching the data items to be encoded or decoded forming the annulus data 80 every two seconds or every integral multiple of two seconds).

The low-resolution-data encoding processing by the codec processor 139 includes processing for converting the resolution of the original data to generate low-resolution data.

Accordingly, the codec processor 139 can decode input compression-coded data and can also encode decoded data simultaneously, thereby achieving fast format conversion. The codec processor 139 can also perform different encoding operations in parallel. Thus, when generating data to be recorded on the optical disc 17, the codec processor 139 can encode original data into a predetermined format and also generate low-resolution data in parallel.

In known codec processing, when recording data input from an external source on the optical disc 17 by using a single encoding processor, after decoding original data, the decoded original data is encoded, and then, encoding processing for generating low-resolution data is performed. Accordingly, after finishing encoding all the original data and low-resolution data, the encoded original data and low-resolution data are recorded on the optical disc 17 such that they are multiplexed in a time division manner according to the recording format discussed with reference to FIG. 3A or 3B. In contrast, by using the codec processor 139, the original data can be encoded into a predetermined format and low-resolution data can be generated in parallel (or in a time-division manner) without depending on the system clock of the baseband signal. Accordingly, when the encoding of the original data and low-resolution data forming the annulus data 80 shown in FIG. 3A is finished, the annulus data 80 are sequentially recorded on the optical disc 17. That is, before finishing encoding all the data, the recording of the encoded data on the optical disc 17 can be started, thereby achieving fast data processing.

The codec processor 139 divides frame data into m items of data and then performs codec processing on each divided data item, thereby increasing the speed of codec processing compared to known codec processing in which processing is performed on each frame.

The data input/output controller 140 controls the input/output of non-compressed data. More specifically, the data input/output controller 140 receives non-compressed data decoded by the codec processor 139, and supplies the data to a chroma-format conversion processor 142 if necessary. The data input/output controller 140 then allows the chroma-format conversion processor 142 to convert the chroma format of the data and a buffer 141 to buffer the converted data therein. The data input/output controller 140 reads the non-compressed data from the buffer 141 in synchronization with the system clock of the baseband signal, and outputs the data to a baseband-signal input/output controller 143. The data input/output controller 140 receives frame data in synchronization with the system clock of the baseband signal from the baseband-signal input/output controller 143, and supplies the frame data to the chroma-format conversion processor 142 if necessary. The data input/output controller 140 then allows the chroma-format conversion processor 142 to convert the chroma format of the data and the buffer 141 to buffer the data. The data input/output controller 140 reads the non-compressed data from the buffer 141 without synchronizing with the system clock of the baseband signal, i.e., based on a different system clock, and supplies the data to the codec processor 139 and allows it to encode the data. The data input/output controller 140 can also be implemented by the above-described FPGA.

The buffer 141 can be formed of, for example, a large-capacity SD RAM, and data is buffered into and read from the buffer 141 under the control of the data input/output processor 140.

The chroma-format conversion processor 142 converts the chroma format of the received data under the control of the data input/output processor 140.

The baseband-signal input/output controller 143 controls the sending and receiving of data to and from another device connected via a synchronous interface, such as SDI. The baseband-signal input/output controller 143 receives a non-compressed video signal and audio signal (baseband signal) of, for example, the SDI format, from an external source and supplies the video signal and audio signal to the data input/output controller 140. The baseband-signal input/output controller 143 also receives a non-compressed video signal and audio signal from the data input/output controller 140 and outputs the signals to an external source. The SDI is a non-compressed digital-video/audio transmission method based on point-to-point transmission, and is defined in the American National Standards Institute (ANSI)/Society of Motion Picture and Television Engineers (SMPTE) 259M.

The operation of the editing terminal device 16 is discussed below. It is now assumed that the editing terminal device 16 receives original data which is coded in a predetermined coding format (for example, original data of a DV format without low-resolution data) from an external network, such as an IEEE1394 network or the Ethernet.

The data conversion controller 136 receives data from an IEEE1394 network via the IEEE1394 interface 134 and the PCI bus 133 or from an external network, such as the Ethernet, via the network interface 135 and the PCI bus 133.

When the compression-coded data supplied to the data conversion controller 136 is output as a baseband signal, it is output to the codec processor 139 and is decoded. Then, the decoded data is supplied to the data input/output controller 140 and is further supplied to the chroma-format conversion processor 142. The chroma format of the data is then converted in the chroma-format conversion processor 142 and the data is then supplied to the buffer 141.

In this case, in the data conversion controller 136, the codec processor 139, the data input/output controller 140, and the chroma-format conversion processor 142, processing is performed based on a system clock without being dependent on the system clock of the baseband signal (in other words, without synchronizing with the system clock of the baseband signal). The system clock which is the base for the operation of the codec processor 139 is referred to as a "first clock", while the system clock of the baseband signal is referred to as a "second clock". It is assumed that the first clock is sufficiently faster than the second clock.

The non-compressed data buffered in the buffer 141 is read out by the data input-output controller 140 based on the second clock corresponding to the synchronizing clock of the baseband signal of, for example, the SDI format, and is supplied to the baseband-signal input/output controller 143.

Conversely, when recording compression-coded data supplied to the data conversion controller 136 on the optical disc 17, the entire processing is performed based on the first clock.

When format conversion is necessary for recording the original data supplied to the data conversion controller 136 on the optical disc 17, the data conversion controller 136 outputs the compression-coded data supplied via the PCI bus 133 to the codec processor 139 and allows it to decode the data. The data decoded in the codec processor 139 is then supplied to the data input/output controller 140 and is further supplied to the chroma-format conversion controller 142. The chroma format of the data is converted in the chroma-format conversion controller 142 and the data is again supplied to the codec processor 139. Upon receiving the non-compressed data, the codec processor 139 encodes the data into a data format that can be recorded on the optical disc 17 so as to generate original data coded in a predetermined format, and also generates (encodes) low-resolution data and supplies the original data and the low-resolution data to the data conversion controller 136.

The original data and the low-resolution data are then supplied to the buffer 137. The original data and the low-resolution data are then sequentially read out by the data conversion controller 136 to the disc drive 138 so that they can be recorded on the optical disc 17 in a time-division manner as in the format shown in FIG. 3A or 3B.

When format conversion is not necessary for recording compression-coded data supplied to the data conversion controller 136 on the optical disc 17 as original data, the data conversion controller 136 temporarily stores the original data supplied via the PCI bus 133 in the buffer 137, and also outputs the supplied data to the codec processor 139 and allows it to decode the data. The data decoded in the codec processor 139 is then supplied to the data input/output controller 140 and is further supplied to the chroma-format conversion controller 142. The chroma format of the data is converted in the chroma-format conversion controller 142 and the data is again supplied to the codec processor 139. The codec processor 139 generates (encodes) low-resolution data and supplies it to the data conversion controller 136.

The low-resolution data is then supplied to the buffer 137. The original data and the low-resolution data are then sequentially read out by the data conversion controller 136 to the disc drive 138 so that they can be recorded on the optical disc 17 in a time-division manner as in the format shown in FIG. 3A or 3B.

A description is now given of the operation of the editing terminal device 16 when a baseband signal input from the baseband-signal input/output controller 143 is stored in the optical disc 17 or is output to the IEEE1394 network or an external network.

Upon receiving the input of non-compressed video data and audio data, the baseband-signal input/output controller 143 supplies the video data and audio data to the data input/output controller 140 based on the second clock, which is the system clock of the baseband signal. The data input/output controller 140 buffers the received data in the buffer 141 based on the second clock. The data input/output controller 140 then reads the data buffered in the buffer 141 based on the first clock, which does not synchronize with the second clock, and supplies the read data to the chroma-format conversion processor 142 if necessary. The chroma format of the data is then converted in the chroma-format conversion processor 142 and the converted data is then supplied to the codec processor 139.

The codec processor 139 is operated based on the first clock, and when recording the data on the optical disc 17 and if the format of the data to be recorded on the optical disc 17 is, for example, IMX, the codec processor 139 encodes the supplied data into IMX data and supplies it to the data conversion controller 136. The data conversion controller 136 then supplies the IMX data to the disc drive 138 and records the data on the optical disc 17. When outputting the data to the IEEE1394 network or an external network, the codec processor 139 encodes the supplied non-compressed data into, for example, the DV format, compliant with the standards of a communicating party, and supplies the encoded data to the data conversion controller 136. The data conversion controller 136 supplies the encoded data to the IEEE1394 interface network 134 or the network interface 135 via the PCI bus 133.

The operation of the editing terminal device 16 when data recorded on the optical disc 17 is played back and is output to an external source is described below.

The disc drive 138 reads data which is input via the PCI bus 133 and the data conversion controller 136 and is recorded on the optical disc 17 according to a control signal from the controller 132, and supplies the read data to the data conversion controller 136. Under the control of the controller 132, the data conversion controller 136 controls the codec processor 139 based on whether the communicating party to receive the data is the IEEE1394 network connected to the IEEE1394 interface 134, an external network, such as the Ethernet, connected to the network interface 135, or another device (baseband output) connected to the baseband-signal input/output controller 143 via a synchronous interface, such as SDI.

It is now assumed that the video data stored in the optical disc 17 is the IMX format and the video data to be output to the IEEE1394 network or an external network is the DV format.

If the communicating party to which the data is output is a device connected to the baseband-signal input/output controller 143 via a synchronous interface, such as SDI, the data conversion controller 136 controls the codec processor 139 to decode the IMX-format data. The codec processor 139 decodes the IMX-format data based on the first clock. The decoded data is then supplied to the data input/output controller 140 and is further supplied to the chroma-format conversion processor 142. The chroma format of the data is then converted in the chroma-format conversion processor 142 and the converted data is then supplied to the buffer 141. The non-compressed data buffered in the buffer 141 is read out by the data input/output controller 140 based on the second clock, which is the system clock of the baseband signal, and is then supplied to the baseband-signal input/output controller 143. The data is then output from the baseband-signal input/output controller 143.

If the communicating party to which the data is output is the IEEE1394 network or an external network, the data conversion controller 136 controls the codec processor 139 to decode the IMX-format data. The coded processor 139 decodes the IMX-format data based on the first clock. The decoded data is then supplied to the data input/output controller 140 and is further supplied to the chroma-format conversion processor 142. The chroma format of the data is then converted in the chroma-format conversion processor 142. The resulting data is again supplied to the codec processor 139 and is encoded into the DV format based on the first clock. The encoded DV-format data is supplied to the IEEE1394 interface 134 or the network interface 135 from the data conversion controller 136 via the PCI bus 133. The data is then output from the IEEE1394 network 134 or the network interface 135.

The output processing for a baseband signal by the editing terminal device 16 is discussed below with reference to the flowchart of FIG. 5.

In step Si, the data conversion controller 136 supplies data to be output as a baseband signal to the codec processor 139. More specifically, the data conversion processor 136 receives data read by the disc drive 138 and recorded on the optical disc 17, or receives data from the IEEE1394 network via the IEEE1394 interface 134 and the PCI bus 133 or data from an external network, such as the Ethernet, via the network interface 135 and the PCI bus 133, and supplies the received data to the codec processor 139.

In step S2, the codec processor 139 decodes the supplied data based on the first clock, which is independent of the system clock of the baseband signal, and supplies the decoded data to the data input/output controller 140.

In step S3, if the chroma format of the decoded data is different from the chroma format defined by the interface, for example, SDI, of the baseband signal controlled by the baseband-signal input/output controller 143, the data input/output controller 140 supplies the decoded data to the chroma-format conversion processor 142, and the chroma format of the data is converted in the chroma-format conversion processor 142.

In step S4, the data input/output controller 140 buffers the non-compressed data in the buffer 141. The entire processing on the data before being buffered in the buffer 141 can be executed based on the first clock, independent of the system clock of the baseband signal.

In step S5, the data input/output controller 140 reads the non-compressed data from the buffer 141 as a baseband signal based on the second clock, which is dependent on the system clock of the baseband signal, and supplies the data to the baseband-signal input/output controller 143. The data is then output from the baseband-signal input/output controller 143. The process is then completed.

According to the above-described processing, the decoding processing by the codec processor 139 is based on the first clock different from the second clock, which is the system clock of the baseband signal. Although the first clock is higher than the second clock, the timing control for outputting the baseband signal is not disturbed since the data buffered in the buffer 141 is output as the baseband signal.

Figure 5:
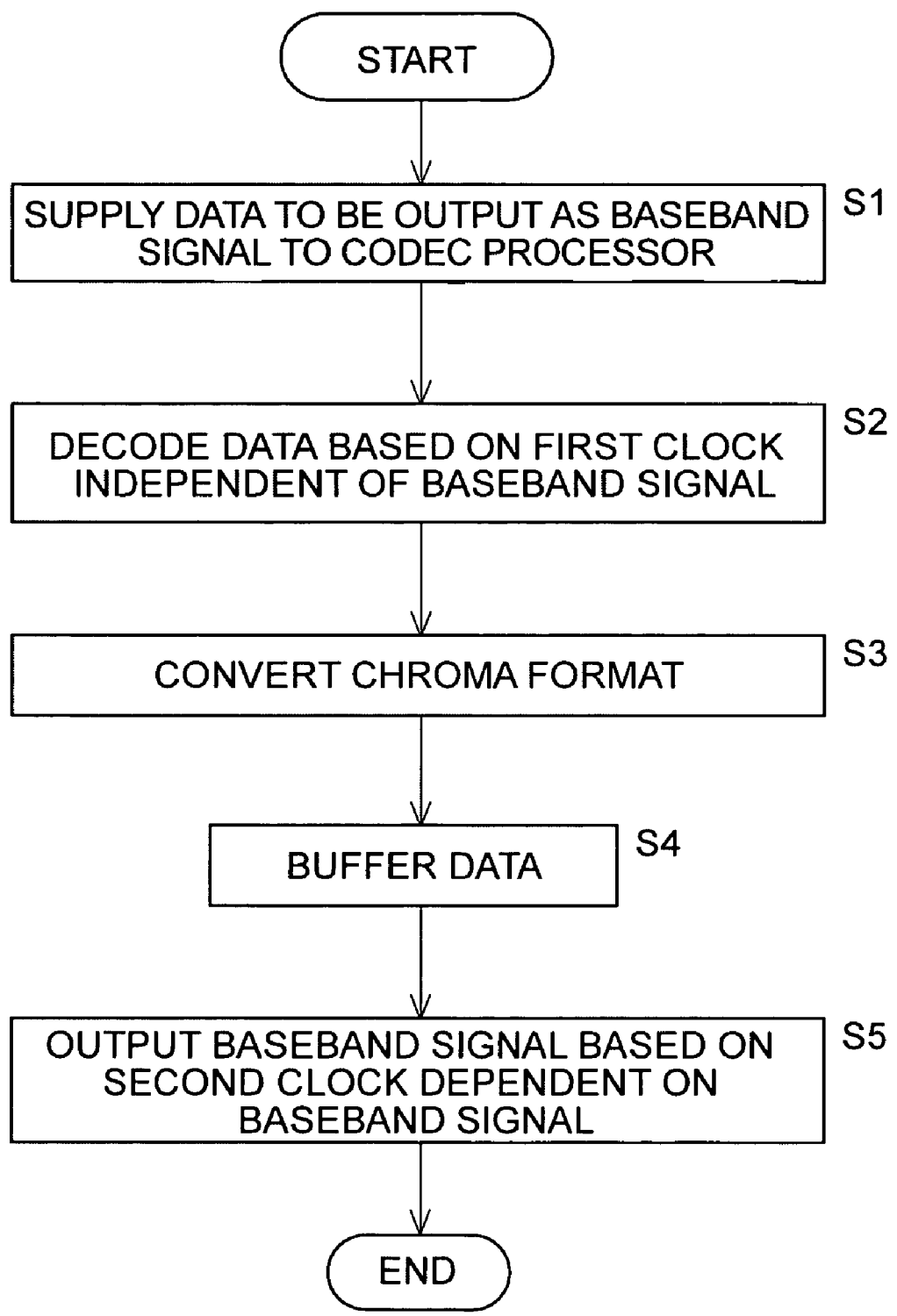
FIG. 5 is a flowchart illustrating output processing for a baseband signal.
Figure 6:
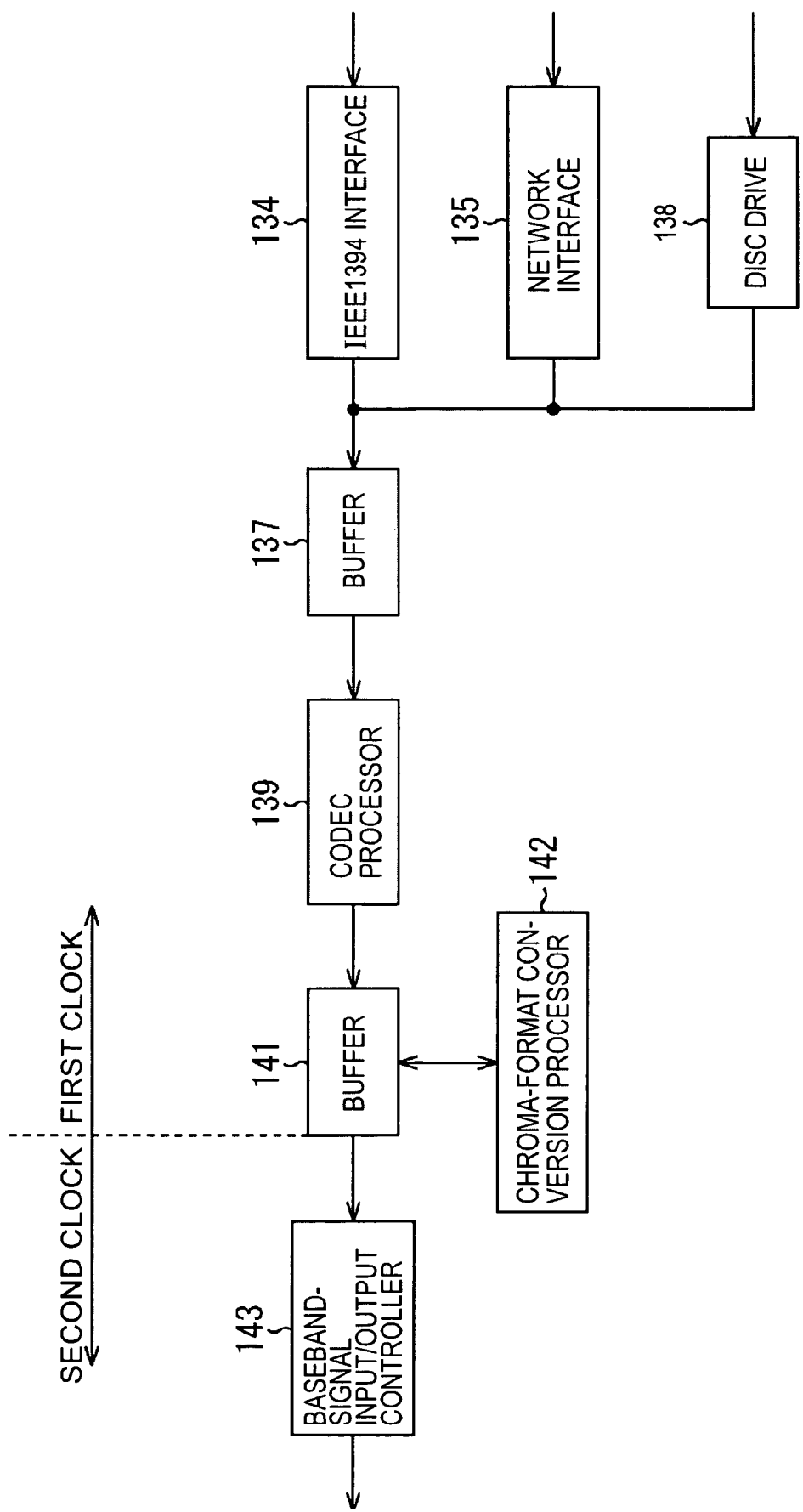
FIG. 6 illustrates a data flow when the output processing shown in FIG. 5 is performed.

FIG. 6 illustrates a data flow when the output processing for the baseband signal described with reference to FIG. 5 is performed in the editing terminal device shown in FIG. 4. The compression-coded data supplied from the IEEE1394 interface 134, the network interface 135, or the disc drive 138 is buffered in the buffer 137 and is then decoded in the codec processor 139. Then, if necessary, the chroma format of the decoded data is converted in the chroma-format conversion processor 142 and the converted data is then buffered in the buffer 141. Before the data is buffered in the buffer 141, the data can be processed based on the first clock without being dependent on the second clock, which is the system clock of the baseband signal. Accordingly, if the decoding processing by the codec processor 139 is sufficiently high, the data can be processed at a rate equivalent to the transfer rate of the data supplied via the IEEE1394 interface 134, the transfer rate of the data supplied via the network interface 135, or the reading speed of data from the optical disc 17 by the disc drive 138.

The non-compressed data buffered in the buffer 141 is read out based on the second clock, which is the system clock of the baseband signal, and is supplied to the baseband-signal input/output controller 143. The data is then output from the baseband-signal input/output controller 143. Accordingly, even though the data processing rate before the data is buffered in the buffer 141 after being supplied from the IEEE1394 interface 134, the network interface 135, or the disc drive 138 is not based on the second clock, processing for outputting the data is not disturbed.

Figure 7:
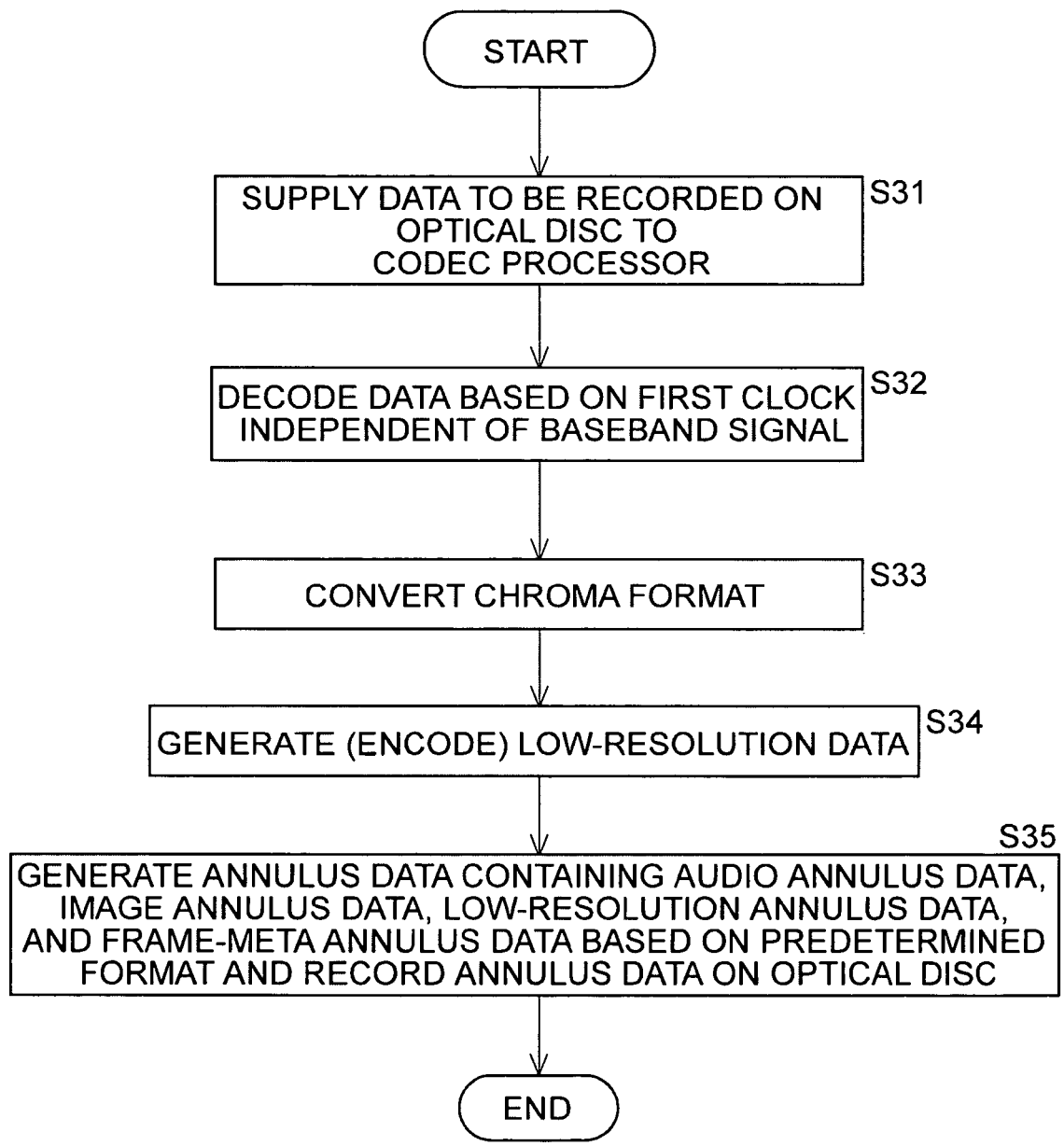
FIG. 7 is a flowchart illustrating recording processing for an input signal other than a baseband signal on an optical disc.

A description is now given, with reference to the flowchart of FIG. 7, of recording processing for an input signal other than the baseband signal on the optical disc 17.

It is now assumed that format conversion is not necessary for recording data supplied to the data conversion controller 136 as original data.

In step S31, the data conversion processor 136 supplies data to be recorded on the optical disc 17 to the codec processor 139. More specifically, the data conversion controller 136 supplies data received via the IEEE1394 interface 134 and the PCI bus 133, or data received via the network interface 135 and the PCI bus 133 to the codec processor 139. The data conversion controller 136 also temporarily stores the original data in the buffer 137.

In step S32, the codec processor 139 decodes the supplied coded signal, i.e., the data to be recorded on the optical disc 17, based on the first clock without being dependent on the system clock of the baseband signal, and supplies the decoded data to the data input/output controller 140.

In step S33, when the chroma format of the supplied data is different from that of low-resolution data, the data input/output controller 140 supplies the received data to the chroma-format conversion processor 142, and the chroma format of the data is converted.

In step S34, the data input/output controller 140 supplies the non-compressed data converted by the chroma-format conversion processor 142 to the codec processor 139. The codec processor 139 then generates (encodes) low-resolution data and supplies it to the data conversion controller 136.

In step S35, the data conversion controller 136 supplies the low-resolution data to the buffer 137 and also generates the audio annulus data 81, the image annulus data 82, the low-resolution annulus data 83, and the frame-meta annulus data 84 by using the coded data and low-resolution data stored in the buffer 137 based on the predetermined format shown in FIG. 3A. The data conversion controller 136 supplies the generated annulus data 80 to the disc drive 138 and records the data on the optical disc 17, and the process is then completed.

The entire processing discussed with reference to FIG. 7 can be performed based on a system clock which does not synchronize with the second clock.

According to the above-described processing, input data can be recorded on the optical disc 17 based on a system clock which does not synchronize with the second clock. Thus, the recording processing for data input from a fast external interface on the optical disc 17 can be performed at higher speed compared to known recording processing in which codec processing is performed based on the second clock.

Figure 8:
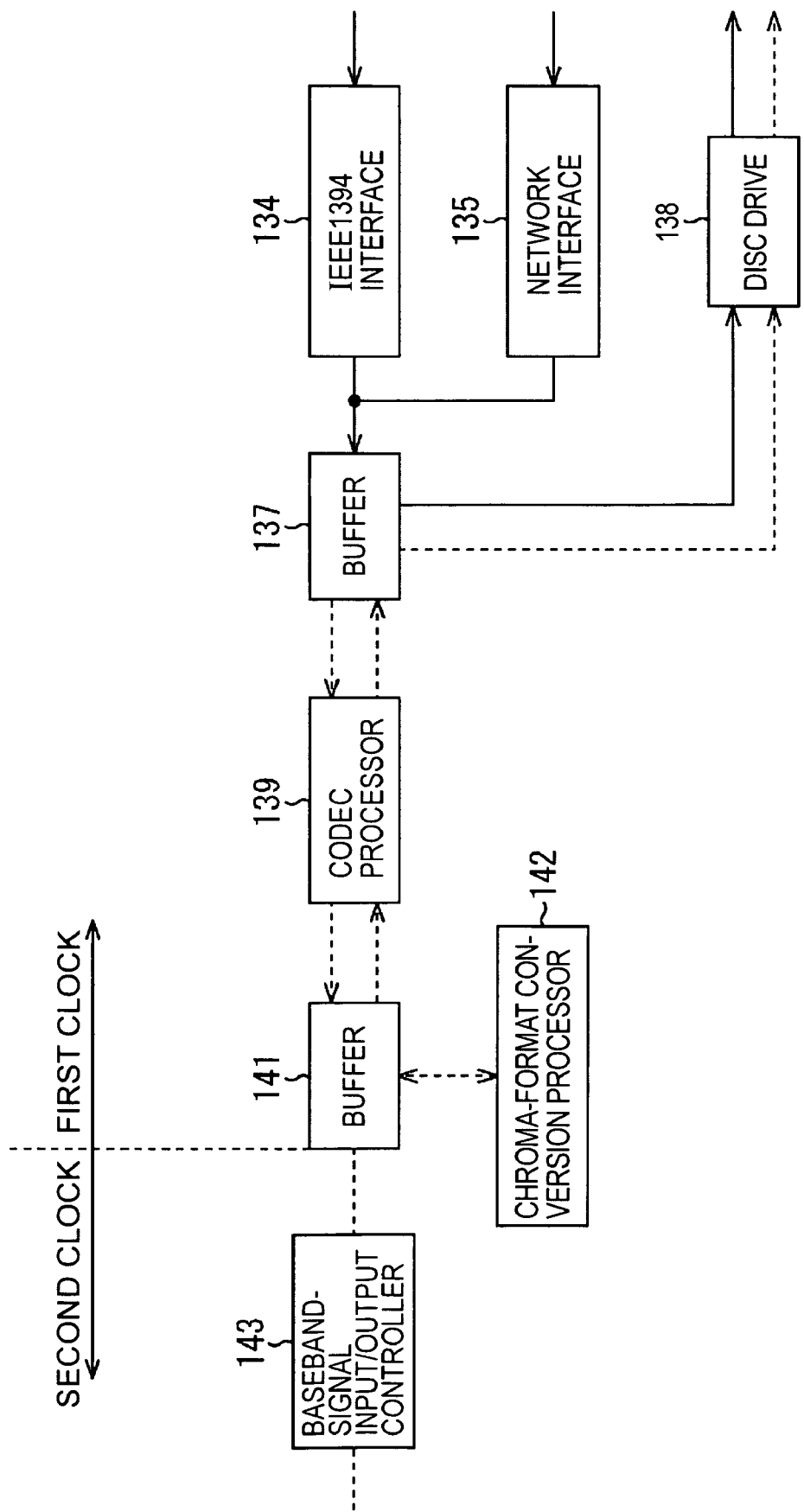
FIG. 8 illustrates a data flow when the recording processing shown in FIG. 7 is performed.

FIG. 8 illustrates a data flow when the recording processing discussed with reference to FIG. 7 for an input signal other than a baseband signal on the optical disc is performed in the editing terminal device 16 shown in FIG. 4. In FIG. 8, the arrows indicated by the solid lines represent a data flow for generating the original data to be recorded on the optical disc 17, while the arrows indicated by the broken lines designate a data flow for generating the low-resolution data to be recorded on the-optical disc 17.

The original data contained in the coded data supplied from the IEEE1394 interface 134 or the network interface 135 is buffered in the buffer 137, and for generating low-resolution data, the original data is also decoded in the codec processor 139, and the chroma format of the data is converted in the chroma-format conversion processor 142. The converted data is again supplied to the codec processor 139 to generate low-resolution data, and the low-resolution data is buffered in the buffer 137. Then, the annulus data 80 formed of the audio annulus data 81, the image annulus data 82, the low-resolution annulus data 83, and the frame-meta annulus data 84 shown in FIG. 3A is generated by using the original data and low-resolution data stored in the buffer 137. The generated annulus data 80 is then supplied to the disc drive 138 and is recorded on the optical disc 17. The entire processing discussed with reference to FIGS. 7 and 8 can be performed based on a clock which does not synchronize with the second clock, which is the system clock of the baseband signal. For example, the processing can be executed based on a clock synchronizing with the first clock, which is the base for the operation of the codec processor 139.

Accordingly, recording processing for data input from a fast external interface on the optical disc 17 can be performed at higher speed compared to known-recording processing in which codec processing is performed based on the second clock.

Figure 9:
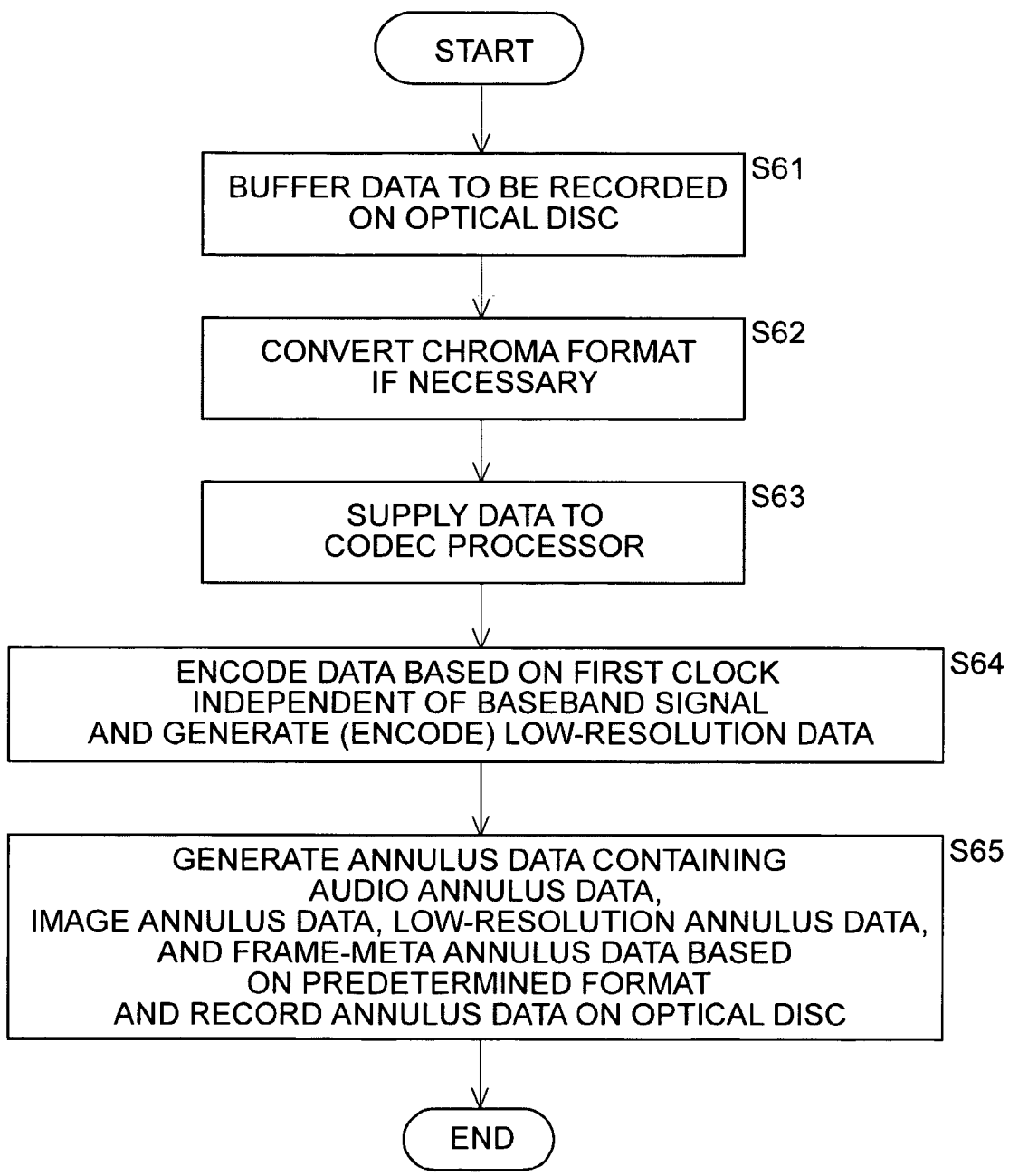
FIG. 9 is a flowchart illustrating recording processing for a baseband input signal on an optical disc.

Recording processing for a baseband input signal on the optical disc 17 is described below with reference to the flowchart of FIG. 9.

Upon receiving non-compressed video data and audio data, the baseband-signal input/output controller 143 supplies the video data and audio data to the data input/output controller 140 based on the second clock, which is the system clock of the baseband signal, at a rate corresponding to the synchronous clock of the baseband signal of, for example, the SDI format. In step S61, the data input/output controller 140 receives data to be recorded on the optical disc 17 from the baseband-signal input/output controller 143, and buffers the data in the buffer 141.

In step S62, if the chroma format of the non-compressed data, for example, SDI data, supplied from the baseband-signal input/output controller 143 is different from the coding format recorded on the optical disc 17, the data input/output controller 140 supplies the non-compressed data to the chroma-format conversion processor 142 and the chroma format of the data is converted.

In step S63, the data input/output controller 140 supplies the data to be recorded on the optical disc 17 to the codec processor 139.

In step S64, the codec processor 139 encodes the original data into the coding format to be recorded on the optical disc 17 based on the first clock without being dependent on the baseband signal, and also generates (encodes) low-resolution data, and supplies the original data and the low-resolution data to the data conversion controller 136.

In step S65, the data conversion controller 136 supplies the coded original data and low-resolution data to the buffer 137, and also generates the annulus data 80 containing the audio annulus data 81, the image annulus data 82, the low-resolution annulus data 83, and the frame-meta annulus data 84 by using the original data and low-resolution data stored in the buffer 137 based on the predetermined format shown in FIG. 3A. The data conversion controller 136 then supplies the annulus data 80 to the disc drive 138 and records the annulus data 80 on the optical disc 17. The process is then completed.

According to the above-described processing, the baseband signal input at the frame rate defined by the second clock can be recorded on the optical disc 17 based on a clock which does not synchronize with the second clock. Thus, recording processing for the data on the optical disc 17 can be performed at higher speed compared to known recording processing in which codec processing is performed based on the second clock.

Figure 10:
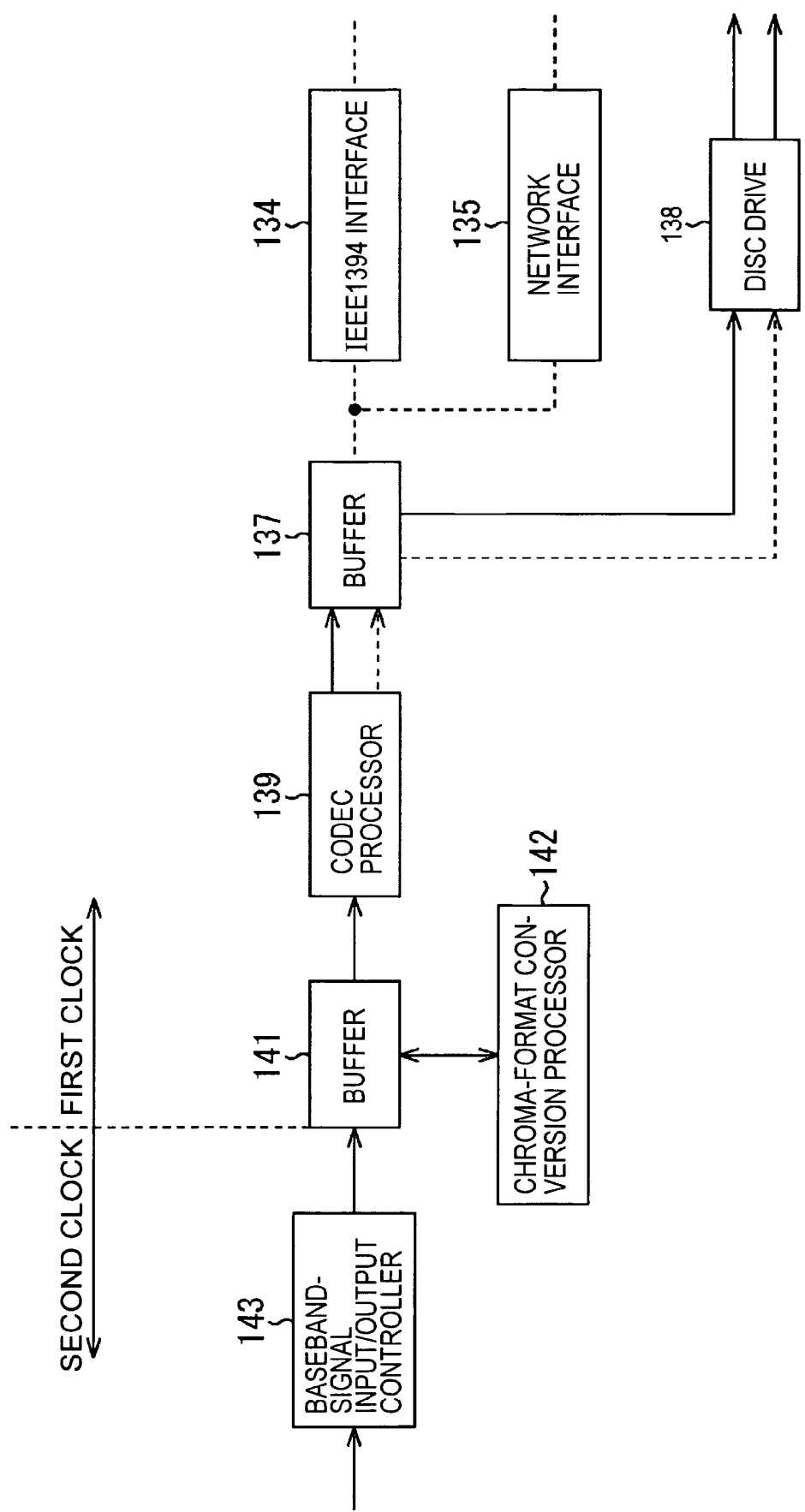
FIG. 10 illustrates a data flow when the recording processing shown in FIG. 9 is performed.

FIG. 10 illustrates a data flow when the recording processing discussed with reference to FIG. 9 for the baseband input signal on the optical disc 17 is performed in the editing terminal device 16 shown in FIG. 4. In FIG. 10, the arrows indicated by the solid lines represent a data flow for generating the original data to be recorded on the optical disc 17, while the arrows indicated by the broken lines designate a data flow for generating the low-resolution data to be recorded on the optical disc 17.

As shown in FIG. 10, the non-compressed baseband signal input from the baseband-signal input/output controller 143 is supplied to the buffer 141 at the frame rate based on the second clock and is buffered therein. The chroma format of the data buffered in the buffer 141 is converted in the chroma-format conversion processor 142 if necessary.

The non-compressed data buffered in the buffer 141 is read out based on the first clock which does not synchronize with the second clock, and is supplied to the codec processor 139. The non-compressed data supplied to the codec processor 139 is coded into the data format to be recorded on the optical disc 17, and also, low-resolution data is generated, and the original data and low-resolution data are buffered in the buffer 137. Then, the annulus data 80 containing the audio annulus data 81, the image annulus data 82, the low-resolution annulus data 83, and the frame-meta annulus data 84 is generated by using the original data and low-resolution data stored in the buffer 137 based on the predetermined format shown in FIG. 3A. The generated annulus data 80 is then supplied to the disc drive 138 and is recorded on the optical disc 17.

The above-described series of processing can be implemented by hardware or software. If software is used to implement the processing, a corresponding software program is installed into a computer and is executed on the computer. As a result, the functions of the above-described disc recording/playback apparatus can be implemented.

Figure 11:
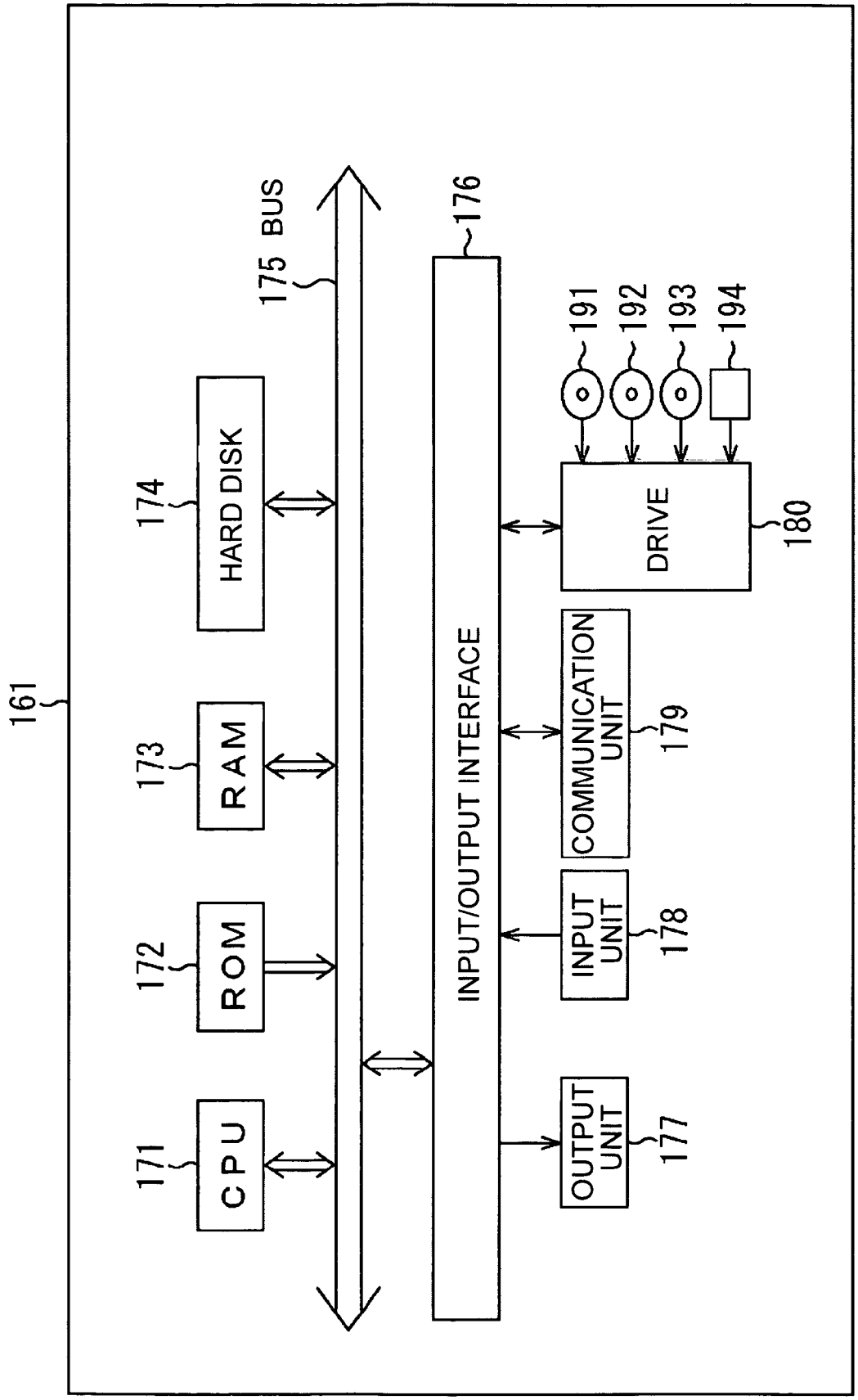
FIG. 11 is a block diagram illustrating the configuration of a personal computer.

FIG. 11 is a block diagram illustrating a computer 161 functioning as the editing terminal device 16 according to an embodiment of the present invention. An input/output interface 176 is connected to a CPU 171 via a bus 175. In response to an instruction from a user through an input unit 178 including a keyboard and a mouse, the CPU 171 loads a program stored in a recording medium, such as a magnetic disk 191, an optical disc 192, a magneto-optical disk 193, or a semiconductor memory 194, installed in a ROM 172, a hard disk 174, or a drive 180 into a RAM 173 and executes the program. As a result, the above-described various processing can be performed. The CPU 171 can also output a processing result to an output unit 177 including a liquid crystal display (LCD) via the input/output interface 176. The program may be stored in the hard disk 174 or the ROM 172 and be provided to the user integrally with the computer 161. Alternatively, the program may be provided as a package medium, such as the magnetic disk 191, the optical disc 192, the magneto-optical disk 193, or the semiconductor memory 194, or may be provided to the hard disk 174 from a satellite or a network via a communication unit 174.

In this specification, steps forming the program may be executed in chronological order indicated by the above-described flowcharts. Alternatively, the steps may be executed individually or in parallel.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus performing processing for recording first data on a recording medium, comprising:
a baseband-signal output controller controlling an output of a baseband signal;
a first buffer buffering the baseband signal to be output under the control of the baseband-signal output controller;
a chroma-format conversion processor converting the chroma format of the baseband signal received from the first buffer and returning the chroma-converted baseband signal to the first buffer;
a codec performing codec processing on the chroma-converted baseband signal based on a first system clock, which is different from a second system clock of the baseband signal; and
a recorder recording the first data on the recording medium.

2. The recording apparatus according to claim 1, wherein the first data recorded on the recording medium includes at least second data having a predetermined resolution and third data having a resolution lower than the second data, and
the codec encodes the second data and the third data in parallel.

3. The recording apparatus according to claim 1, wherein the first data recorded on the recording medium includes at least second data having a predetermined resolution and third data having a resolution lower than the second data, and
the codec encodes the second data and the third data by switching the second data and the third data at regular time intervals.

4. The recording apparatus according to claim 1, further comprising:
a compression-coded data input/output controller controlling an input and an output of compression-coded second data having a predetermined resolution based on the first system clock; and
a second buffer buffering the second data to be output under the control of the compression-coded data input/output controller or the first data to be recorded on the recording medium,
wherein, when a format of the second data to be input under the control of the compression-coded data input/output controller is equal to a format of the first data,
the second buffer buffers the second data,
the codec decodes the second data to generate third data having a resolution lower than the second data, and then further encodes the third data, and the recorder records the first data including the second data buffered in the second buffer and the third data encoded by the codec on the recording medium.

5. The recording apparatus according to claim 4, wherein the first data is time-division multiplexed data in which a plurality of types of data including at least the second data and the third data are multiplexed by being divided at regular time intervals.

6. The recording apparatus according to claim 1, further comprising:
a compression-coded data input/output controller controlling an input and an output of compression-coded second data having a predetermined resolution based on the first system clock,
wherein, when a format of the second data to be input under the control of the compression-coded data input/output controller is different from a format of the first data to be recorded on the recording medium,
the codec decodes the second data and then encodes the decoded second data with the same format as the first data, and also generates third data having a resolution lower than the decoded second data and then further encodes the third data, and
the recorder records the second data and the third data encoded by the codec on the recording medium.

7. The recording apparatus according to claim 6, wherein the first data is time-division multiplexed data in which a plurality of types of data including at least the second data and the third data are multiplexed by being divided at regular time intervals.

8. A recording method for a recording apparatus recording first data generated based on compression-coded data of a baseband signal on a predetermined recording medium, the recording method comprising the steps of:
decoding in a codec processor the compressed-coded data having a predetermined resolution into non-compressed data based on a predetermined system clock, which is different from a system clock of the baseband signal;
chroma-format converting the non-compressed data in a chroma-format conversion processor;
converting the chroma-format converted non-compressed data in the codec processor into low-resolution data having a resolution lower than the compression-coded data and encoding the low-resolution data by a predetermined method to generate low-resolution second data;
generating in a data conversion controller the first data including at least the compression-coded data and the low-resolution second data; and
recording the first data on the recording medium by the data conversion controller.

9. A computer readable medium encoded with a computer-readable program that when executed on a processor cause the processor to execute a method for recording first data generated based on compression-coded data on a predetermined recording medium, the method comprising the steps of:
decoding the compressed-coded data having a predetermined resolution into non-compressed data based on a predetermined system clock, which is different from a system clock of a baseband signal;
chroma-format converting the non-compressed data;
converting the chroma-format converted non-compressed data into low-resolution data having a resolution lower than the compression-coded data and encoding the low-resolution data by a predetermined method to generate low-resolution second data;
generating the first data including at least the compression-coded data and the low-resolution second data; and
recording the first data on the recording medium.

10. A recording method for a recording apparatus recording first data generated based on non-compressed data on a predetermined recording medium, the recording method comprising the steps of:
buffering in a buffer the non-compressed data having a predetermined resolution input based on a system clock of a baseband signal;
reading by a data input/output controller the buffered non-compressed data;
chroma-format converting the non-compressed data in a chroma-format conversion processor;
encoding in a codec processor the chroma-format converted non-compressed data based on a predetermined system clock, which is different from the system clock of the baseband signal, to generate second data;
converting the chroma-format converted non-compressed data in the codec processor into low-resolution data and encoding the low-resolution data based on the predetermined system clock, which is different from the system clock of the baseband signal, to generate low-resolution third data;
generating in a data conversion controller the first data including at least the encoded second data and the encoded third data; and
recording the first data on the recording medium by the data conversion controller.

11. A computer-readable medium encoded with a computer-readable program that when executed on a processor cause the processor to execute a method for recording first data generated based on non-compressed data on a predetermined recording medium, the method comprising the steps of:
buffering the non-compressed data having a predetermined resolution input based on a system clock of a baseband signal;
reading the buffered non-compressed data;
chroma-format converting the non-compressed data;
encoding the chroma-format converted non-compressed data based on a predetermined system clock, which is different from the system clock of the baseband signal, to generate second data;
converting the chroma-format converted non-compressed data into low-resolution data and encoding the low-resolution data based on a predetermined system clock, which is different from the system clock of the baseband signal, to generate low-resolution third data;
generating the first data including at least the encoded second data and the encoded third data; and
recording the first data on the recording medium.

* * * * *